United States Patent
Choi et al.

(10) Patent No.: US 11,849,454 B2
(45) Date of Patent: Dec. 19, 2023

(54) METHOD AND DEVICE FOR CONFIGURING DEMODULATION REFERENCE SIGNAL FOR UPLINK CONTROL CHANNEL IN WIRELESS CELLULAR COMMUNICATION SYSTEM

(71) Applicant: Samsung Electronics Co., Ltd., Gyeonggi-do (KR)

(72) Inventors: Seunghoon Choi, Gyeonggi-do (KR); Taehyoung Kim, Gyeonggi-do (KR); Jeongho Yeo, Gyeonggi-do (KR); Jinyoung Oh, Gyeonggi-do (KR)

(73) Assignee: Samsung Electronics Co., Ltd

( * ) Notice: Subject to any disclaimer, the term of this patent is extended or adjusted under 35 U.S.C. 154(b) by 252 days.

(21) Appl. No.: 17/201,590

(22) Filed: Mar. 15, 2021

(65) Prior Publication Data

US 2021/0204278 A1 Jul. 1, 2021

Related U.S. Application Data

(62) Division of application No. 16/534,467, filed on Aug. 7, 2019, now Pat. No. 10,952,189.

(30) Foreign Application Priority Data

Aug. 9, 2018 (KR) .......................... 10-2018-0092919

(51) Int. Cl.
*H04W 72/21* (2023.01)
*H04L 5/10* (2006.01)
(Continued)

(52) U.S. Cl.
CPC ........... *H04W 72/21* (2023.01); *H04L 1/1819* (2013.01); *H04L 5/0051* (2013.01);
(Continued)

(58) Field of Classification Search
None
See application file for complete search history.

(56) References Cited

U.S. PATENT DOCUMENTS 9,876,615 B2 * 1/2018 You .................. H04L 5/0055
10,541,788 B2 * 1/2020 You .................. H04L 1/1812
(Continued)

FOREIGN PATENT DOCUMENTS

EP          2538601 A2 * 12/2012 ........... H04L 1/0026

OTHER PUBLICATIONS

Ericsson, "Summary of Contributions on PUCCH Structure in Short-Duration", R1-1801094, 3GPP TSG RAN WG1 Meeting AH 1801, Jan. 22-26, 2018, 10 pages.
(Continued)

*Primary Examiner* — Edan Orgad
*Assistant Examiner* — Emmanuel K Maglo
(74) *Attorney, Agent, or Firm* — The Farrell Law Firm, P.C.

(57) ABSTRACT

The disclosure relates to a communication method and system for converging a $5^{th}$-Generation (5G) communication system for supporting higher data rates beyond a $4^{th}$-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. A base station in a wireless communication system includes a transceiver configured to transmit and receive a signal; and a controller configured to transmit, to a terminal, a control message including first information configuring a physical uplink control channel (PUCCH) resource of a PUCCH format 2, second information associated with a demodula-
(Continued)

tion reference signal (DMRS) for physical uplink shared channel (PUSCH) of a mapping type A, and third information associated with a DMRS for PUSCH of a mapping type B, identify the PUCCH resource based on the first information, and receive, from the terminal on the PUCCH resource, a DMRS for PUCCH format 2 based on the control message. A sequence of the DMRS for PUCCH format 2 is generated based on a scrambling identity (ID) included in the third information of the control message.

20 Claims, 10 Drawing Sheets

(51) Int. Cl.
  *H04W 80/08* (2009.01)
  *H04L 1/1812* (2023.01)
  *H04L 5/00* (2006.01)
(52) U.S. Cl.
  CPC .............. *H04L 5/0055* (2013.01); *H04L 5/10* (2013.01); *H04W 80/08* (2013.01)

(56) References Cited

U.S. PATENT DOCUMENTS

| | | | |
|---|---|---|---|
| 11,252,705 B2* | 2/2022 | Cho | H04W 72/21 |
| 2012/0127950 A1* | 5/2012 | Chung | H04L 5/0055 |
| | | | 370/329 |
| 2014/0185543 A1* | 7/2014 | Kang | H04B 7/0626 |
| | | | 370/329 |
| 2015/0280876 A1* | 10/2015 | You | H04L 5/0044 |
| | | | 370/329 |
| 2017/0325216 A1 | 11/2017 | Nogami | |
| 2017/0366380 A1 | 12/2017 | Hwang et al. | |
| 2018/0123741 A1* | 5/2018 | You | H04L 5/0044 |
| 2019/0149365 A1* | 5/2019 | Chatterjee | H04L 25/0226 |
| | | | 370/329 |
| 2019/0261361 A1* | 8/2019 | Xiong | H04W 72/02 |
| 2019/0281588 A1 | 9/2019 | Zhang | |
| 2020/0092876 A1* | 3/2020 | Cho | H04W 72/21 |
| 2021/0235491 A1* | 7/2021 | Iyer | H04W 72/1268 |

OTHER PUBLICATIONS

European Search Report dated Jun. 30, 2021 issued in counterpart application No. 19847165.8-1205, 8 pages.
3GPP, 3rd Generation Partnership Project; Technical Specification Group Radio Access Network; NR; Radio Resource Control (RRC) Protocol Specification, (Release 15), 3GPP TS 38.331 V15.2.1, Jun. 2018, 303 pages.
3GPP, 3rd Generation Partnership Project; Technical Specification Group Radio Access Network; NR; Physical Channels and Modulation (Release 15), 3GPP TS 38.211 V15.2.0, Jun. 2018, 96 pages.
Qualcomm Incorporated, "Channelization of Short PUCCH", R1-1700823, 3GPP TSG RAN WG1 RAN1 AdHoc, Jan. 16-20, 2017, 8 pages.
Samsung, CR to TS 38.213 Capturing the RAN1#92bis and RAN1#93 Meeting Agreements and Aligning Higher Layer Parameters with TS 38.331, R1-1807957, 3GPP TSG-RAN1 Meeting #93, May 21-25, 2018, 93 pages.
International Search Report dated Nov. 8, 2019 issued in counterpart application No. PCT/KR2019/009496, 9 pages.
Indian Examination Report dated Nov. 23, 2022 issued in counterpart application No. 202037056888, 5 pages.
Huawei, HiSilicon, "Correction for L3 RRM Procedures", R2-1808082, 3GPP TSG-RAN WG2 Meeting #102, May 21-26, 2018, 163 pages.
KR Notice of Patent Grant dated Jun. 1, 2023 issued in counterpart application No. 10-2018-0092919, 8 pages.
Chinese Office Action dated Sep. 18, 2023 issued in counterpart application No. 201980051842.0, 18 pages.

* cited by examiner

METHOD AND DEVICE FOR CONFIGURING DEMODULATION REFERENCE SIGNAL FOR UPLINK CONTROL CHANNEL IN WIRELESS CELLULAR COMMUNICATION SYSTEM

CROSS-REFERENCE TO RELATED APPLICATION(S)

This application is a Continuation of U.S. application Ser. No. 16/534,467, which was filed in the U.S. Patent and Trademark Office on Aug. 7, 2019, and claims priority under 35 U.S.C. § 119 to Korean Patent Application No. 10-2018-0092919, which was filed in the Korean Intellectual Property Office on Aug. 9, 2018, the entire disclosure of each of which is incorporated herein by reference.

BACKGROUND

1. Field

The disclosure relates generally to a method and a device for configuring a reference signal for an uplink control channel in a wireless cellular communication system.

2. Description of Related Art

To meet the increasing demand for wireless data traffic since deployment of $4^{th}$ generation (4G) communication systems, efforts have been made to develop an improved $5^{th}$ generation (5G) or pre-5G communication system. The 5G or pre-5G communication system may also be referred to as "a beyond 4G network" or "a post long term evolution (LTE) system."

The 5G communication system is considered to be implemented in higher frequency (mmWave) bands, e.g., 60 GHz bands, in order to provide higher data rates.

To decrease propagation loss of radio waves and increase transmission distance, beamforming, massive multiple-input multiple-output (MIMO), full dimensional MIMO (FD-MIMO), array antennas, analog beam forming, and large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation, etc. In the 5G system, hybrid frequency-shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as advanced access technologies have been developed.

The Internet is now evolving to the Internet of things (IoT) where distributed entities, such as things, exchange and process information without human intervention.

The Internet of everything (IoE), which is a combination of the IoT technology and the Big Data processing technology through connection with a cloud server, has also emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), etc., have been recently researched. Such an IoT environment may provide intelligent Internet technology services that collect and analyze data generated among connected things. IoT may be applied to a variety of fields including smart homes, smart buildings, smart cities, smart cars or connected cars, smart grids, health care, smart appliances, and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between 5G technology and IoT technology.

Various studies have been conducted on methods for transmitting an uplink control channel in a communication system. Particularly, various methods for transmitting a long physical uplink control channel (PUCCH) have been discussed.

SUMMARY

The disclosure relates to a method for configuring a demodulation reference signal (DMRS) for a short PUCCH format (e.g., PUCCH format 2) among new radio (NR) PUCCH formats, and provides a method and a device for initializing a DMRS sequence for PUCCH format 2.

In accordance with an aspect of the disclosure, a base station is provided for receiving an uplink signal. The base station includes a transceiver configured to transmit and receive a signal; and a controller configured to transmit, to a terminal, a control message including first information configuring a physical uplink control channel (PUCCH) resource of a PUCCH format 2, second information associated with a demodulation reference signal (DMRS) for physical uplink shared channel (PUSCH) of a mapping type A, and third information associated with a DMRS for PUSCH of a mapping type B, identify the PUCCH resource based on the first information, and receive, from the terminal on the PUCCH resource, a DMRS for PUCCH format 2 based on the control message. A sequence of the DMRS for PUCCH format 2 is generated based on a scrambling identity (ID) included in the third information of the control message.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
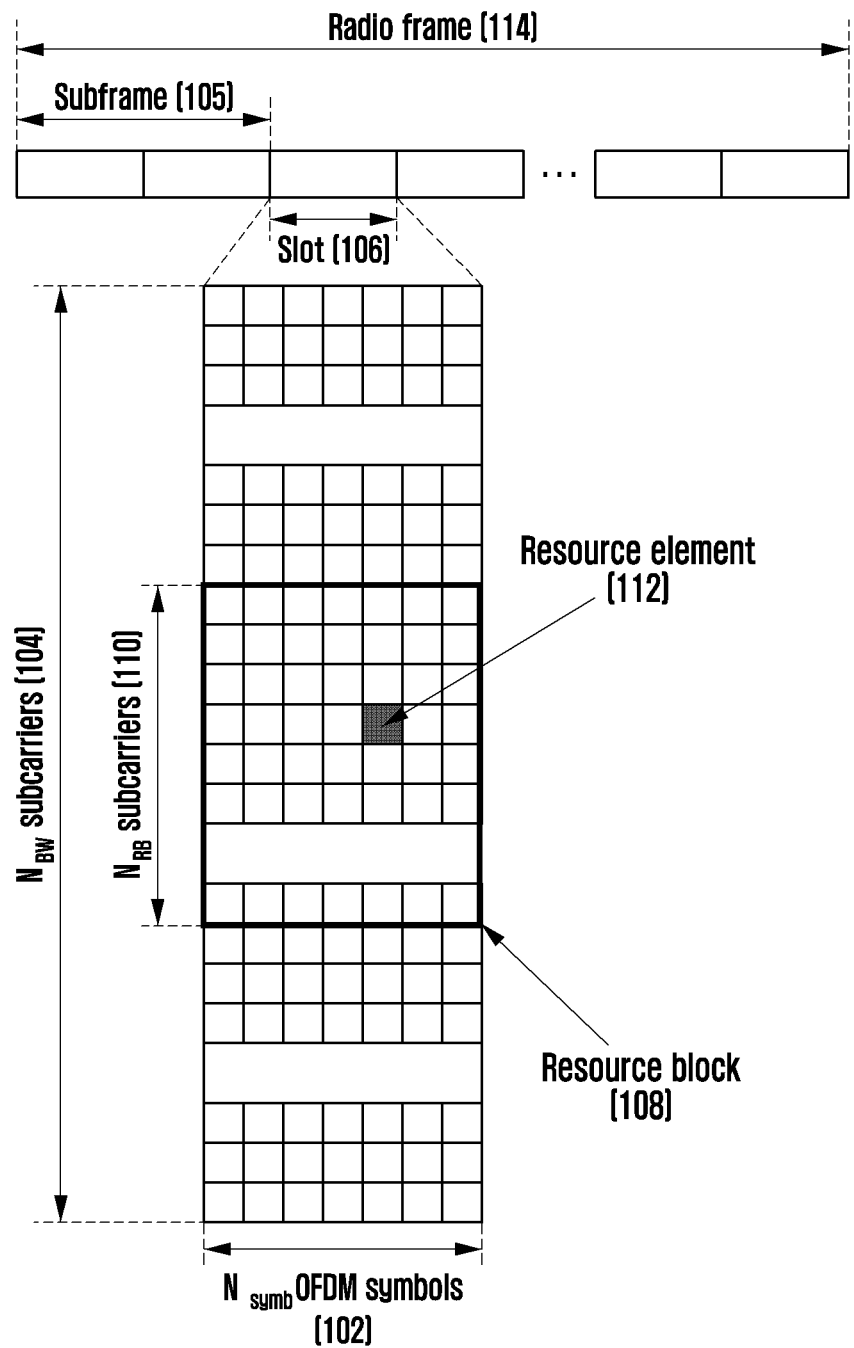
FIG. 1 illustrates a basic structure of a time-frequency domain in an LTE system.

Hereinafter, various embodiments will be described in detail with reference to the accompanying drawings. In the following description of the disclosure, detailed descriptions of known functions or configurations incorporated herein will be omitted when they may make the subject matter of the disclosure rather unclear. The terms as described below are defined in consideration of the functions in the disclosure, and the meaning of the terms may vary according to the intention of a user or operator, convention, etc. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and fully inform those skilled in the art, to which the disclosure belongs, of the scope of the disclosure, and the disclosure is defined only by the scope of the appended claims. Throughout the specification, the same reference numerals designate the same elements.

Each block of the flowcharts and combinations of blocks in the flowcharts can be implemented by computer program instructions. The computer program instructions can be provided to a processor of a general purpose computer, a special purpose computer, or other programmable data processing apparatus, so that the instructions, which are executed via the processor of the computer or other programmable data processing apparatus, implement the functions specified in the flowchart blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction devices that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowcharts may represent a module, a segment, or a part of code, which includes one or more executable instructions for implementing the specified logical function(s). In some alternative implementations, the functions noted in the blocks may occur out of the order. For example, two blocks shown in succession may in fact be executed substantially concurrently or the blocks may sometimes be executed in the reverse order, depending upon the functionality involved.

Herein, the term "unit" refers to a software element or a hardware element, such as a field programmable gate array (FPGA) or an application specific integrated circuit (ASIC), and performs a predetermined function. However, the term "unit" is not limited to software or hardware. A "unit" may be configured either to be stored in an addressable storage medium or to execute one or more processors. Therefore, a "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "units" may be either combined into a smaller number of elements and "units" or divided into additional elements and "units". The elements and "units" may be implemented to reproduce one or more central processing units (CPUs) within a device or a security multimedia card.

Although the detailed description of embodiments is made with reference to a wireless communication system based on orthogonal frequency division multiplexing (OFDM), particularly, the $3^{rd}$ generation partnership project (3GPP) evolved universal terrestrial radio access (EUTRA) standard, the disclosure can also be applied to other communication systems having a similar technical background and channel form after some modification, without departing from the scope of the disclosure and the above can be determined by those skilled in the art.

In general, a mobile communication system is developed to provide voice services while guaranteeing activity of users. However, a mobile communication system has been expanded from the voice service to a data service. In recent years, the mobile communication system has been developed to provide a high-speed data service. However, because resources are lacking and users demand higher speed services in the mobile communication system providing a current service, a more improved mobile communication system is needed.

To meet the increasing demands, standardization of LTE by the 3GPP has been performed as one of the next generation mobile communication systems. LTE is a technology that implements high-speed packet based communication with a transmission rate of up to about 100 Mbps. To this end, several methods are being discussed, including a method of reducing the number of nodes located on a communication channel by simplifying a network architecture, a method of making wireless protocols closest to a wireless channel, etc.

When decoding fails at an initial transmission, the LTE system employs hybrid automatic repeat request (HARQ) that retransmits the corresponding data in a physical layer. HARQ is a method in which, when a receiver has not accurately decoded data, the receiver transmits a negative acknowledgement (NACK) reporting the failure of decoding to a transmitter, which allows the transmitter to retransmit the corresponding data in the physical layer. The receiver combines the data retransmitted by the transmitter with the data that has failed to be decoded in order to improve data reception performance. When the receiver accurately decodes the data, the receiver transmits an acknowledgment (ACK) reporting successful decoding, which allows the transmitter to transmit new data.

FIG. 1 illustrates a basic structure of a time-frequency domain in an LTE system.

Referring to FIG. 1, a transverse axis indicates a time domain and a longitudinal axis indicates a frequency domain. The minimum transmission unit in the time domain is an OFDM symbol. $N_{symb}$ OFDM symbols constitute one slot 106, and two slots constitute one subframe 105. The length of one slot is 0.5 ms, and the length of one subframe is 1.0 ms. A radio frame 114 is a time domain unit including ten subframes. In the frequency domain, the minimum transmission unit is a subcarrier. The entire system transmission bandwidth may include a total number of $N_{BW}$ subcarriers 104.

A basic unit of a resource in the time-frequency domain may be indicated by an OFDM symbol index or subcarrier index as a resource element (RE) 112. A resource block (RB) (or physical resource block (PRB)) 108 is defined as $N_{symb}$ continuous OFDM symbols 102 in the time domain and $N_{RB}$ continuous subcarriers 110 in the frequency domain. Therefore, one RB 108 includes $N_{symb} \times N_{RB}$ REs 112. Generally, the minimum transmission unit of data is an RB as described above.

In an LTE system, generally, $N_{symb}=7$, $N_{RB}=12$, and $N_{BW}$ is proportional to a system transmission bandwidth. A data rate increases in proportion to the number of RBs scheduled to a terminal. In the LTE system, six transmission bandwidths are defined and used. In a frequency division duplex (FDD) system in which a downlink and an uplink are distinguished from each other and are separately operated according to frequencies, a downlink transmission bandwidth and an uplink transmission bandwidth may be different from each other. A channel bandwidth may indicate a radio frequency (RF) bandwidth corresponding to a system transmission bandwidth.

Table 1 below indicates a relationship between a system transmission bandwidth and a channel bandwidth defined in an LTE system. For example, when the LTE system has a channel bandwidth of 10 MHz, the transmission bandwidth may include 50 RBs.

TABLE 1

| | Channel bandwidth $BW_{channel}$[MHz] | | | | | |
|---|---|---|---|---|---|---|
| | 1.4 | 3 | 5 | 10 | 15 | 20 |
| Transmission bandwidth configuration | 6 | 15 | 25 | 50 | 75 | 100 |

A downlink control information is transmitted within an initial N OFDM symbols in the subframe. Generally, N={1, 2, 3}. N varies for each subframe according to the amount of control information to be transmitted to a current subframe. The control information includes a control channel transmission interval indicator indicating the number of OFDM symbols over which the control information is transmitted, scheduling information of downlink data or uplink data, HARQ ACK/NACK signals, etc.

In the LTE system, the scheduling information of downlink data or uplink data is transferred from a base station to a terminal through downlink control information (DCI). An uplink (UL) refers to a wireless link through which the terminal transmits data or control signals to the base station, and a downlink (DL) refers to a wireless link through which the base station transmits data or control signal to the terminal. The DCI may be defined as various formats.

DCI formats are determined according to whether the DCI is scheduling information for uplink data (UL grant) or scheduling information for downlink data (DL grant), whether the DCI is compact DCI in which the magnitude of control information is small, whether spatial multiplexing using a multi-antenna is applied, whether the DCI is power control DCI, etc., and the determined DCI formats are applied and operated. For example, DCI format 1, which is scheduling control information for downlink data (e.g., a DL grant), may be configured to include:

Resource allocation type 0/1 flag: notifies of whether a resource allocation type is type 0 or is type 1. Type 0 applies a bitmap scheme and allocates resources in units of resource block groups (RBGs). In the LTE system, a basic scheduling unit is an RB expressed by time and frequency domain resources, and an RBG includes a plurality of RBs and is used as a basic scheduling unit in the type 0 scheme. Type 1 allows allocation of a predetermined RB in an RBG.

Resource block allocation: notifies of the RB allocated for data transmission. A resource expressed according to a system bandwidth and a resource allocation type is determined.

Modulation and coding scheme (MCS): notifies of the modulation scheme used for data transmission and the size of transport block which is a data to be transported.

HARQ process number: notifies of a HARQ process number.

New data indicator: indicates HARQ initial transmission or retransmission.

Redundancy version: notifies of a HARQ redundancy version.

Transmit power control (TPC) command for PUCCH: notifies of TPC command for a PUCCH, which is an uplink control channel.

The DCI undergoes channel coding and modulation and is transmitted through a physical downlink control channel (PDCCH) or an enhanced PDCCH (EPDCCH). Hereinafter, PDCCH transmission/reception may be understood as DCI transmission/reception on a PDCCH. Similarly, physical downlink shared channel (PDSCH) transmission/reception may be understood as a downlink data transmission/reception on a PDSCH, and the technology may also be applied to other channels.

Generally, DCI is individually channel-coded for each terminal, and configured and transmitted as independent PDCCH. In the time domain, the PDCCH is mapped and transmitted during the control channel transmission interval. The frequency domain mapping position of PDCCH is determined by an identifier (ID) of each terminal, and the mapping position is spread throughout a system transmission band.

Downlink data is transmitted through a PDSCH, which is a downlink data transmission physical channel. The PDSCH is transmitted after the control channel transmission interval. Scheduling information, such as a modulation scheme, a specific mapping position in the frequency domain, etc., may be reported by DCI transmitted via a PDCCH.

Through MCS configured as 5 bits among control information constituting the DCI, a base station notifies a terminal of the modulation scheme applied to a PDSCH to be transmitted and the size of data to be transmitted (transport block size (TBS)). The TBS corresponds to a size before channel coding for error correction is applied to data (e.g., a transport block (TB)) to be transmitted by the base station.

A modulation scheme supported by the LTE system is a quadrature phase shift keying (QPSK), 16 quadrature amplitude modulation (16QAM), and 64QAM, and modulation orders (Qm) thereof correspond to 2, 4, and 6, respectively.

That is, 2 bits per symbol may be transmitted in the QPSK modulation, 4 bits per symbol may be transmitted in the 16QAM, and 6 bits per symbol may be transmitted in the 64QAM.

In 3GPP LTE Release 10, a bandwidth extension technology has been adopted in order to support higher data transmission rate, compared with LTE Release 8. The technology, which is referred to as bandwidth extension or carrier aggregation (CA), may extend bands to increase a data transmission rate by the extended bands, compared with an LTE Release 8 terminal, which transmits data in one band. Each of the bands is referred to as a component carrier (CC), and the LTE Release 8 terminal is specified to have one CC for each of a downlink and an uplink. Further, a downlink CC and an uplink CC system information block (SIB)-2-connected thereto together are referred to as a cell. An SIB-2 connection relationship between the downlink CC and the uplink CC is transmitted through a system signal or a higher layer signal. Through multiple serving cells, a terminal supporting the CA may receive downlink data and may transmit uplink data.

In Release 10, when it is difficult for a base station to transmit a PDCCH to a specific terminal in a specific serving cell, the base station may transmit the PDCCH in another serving cell and may configure a carrier indicator field (CIF) for notifying that the corresponding PDCCH indicates a PDSCH of the another serving cell or a physical uplink shared channel (PUSCH) for uplink data transmission. The CIF may be configured for a terminal supporting the CA. The CIF has been determined such that the same can add 3 bits to PDCCH information in a specific cell to indicate another serving cell. The CIF is included when cross carrier scheduling is performed, and when the CIF is not included, the cross carrier scheduling is not performed. When the CIF is included in DL assignment information, the CIF indicates a serving cell in which a PDSCH scheduled by the DL assignment information is to be transmitted. When the CIF is included in UL assignment information (e.g., a UL grant), the CIF indicates a serving cell in which a PUSCH scheduled by the uplink assignment information is to be transmitted.

As described above, in LTE Release 10, carrier aggregation, which is a bandwidth extension technology, has been defined, and thus multiple serving cells may be configured for a terminal. The terminal periodically or a periodically transmits channel information of the multiple serving cells to a base station for data scheduling of the base station. The base station schedules and transmits data for each carrier, and the terminal transmits ACK/NACK (A/N) feedback on the data that has been transmitted for each carrier. The LTE Release 10 is designed such that a terminal transmits A/N feedback of a maximum of 21 bits and, if the transmission of the A/N feedback and the transmission of the channel information overlap in one subframe, the terminal transmits the A/N feedback and discards the channel information.

LTE Release 11 is designed such that channel information of one cell is multiplexed together with A/N feedback, which allows A/N feedback of a maximum of 22 bits and the channel information of one cell to be transmitted by using PUCCH format 3 in a PUCCH format 3 transmission resource.

LTE Release 13 assumes a scenario for configuring a maximum of 32 serving cells, and has introduced a concept of extending the number of serving cells up to 32 by using licensed bands and unlicensed bands. Further, in consideration of the situation where the number of licensed bands, such as LTE frequency band, is limited, LTE Release 13 has introduced a technology for providing an LTE service in an unlicensed band, such as 5 GHz band. This technology is referred to as a licensed assisted access (LAA).

In LAA, an LTE cell that is a licensed band is operated as a primary cell (P cell) and an LAA cell that is an unlicensed band is operated as a secondary cell (S cell) through application of the carrier aggregation technology in the LTE. Accordingly, as in the LTE, feedback generated in the LAA cell that is an S cell should be transmitted only from the P cell, and in the LAA cell, a downlink subframe and an uplink subframe can be freely applied. Unless otherwise described in the specification, LTE refers to all LTE evolution technologies, such as LTE-advanced (LTE-A) and LAA.

Because a newer communication system since the LTE, i.e., a 5G or NR communication system, should freely reflect various requirements of a user, a service provider, etc., services that meet the various requirements may be supported through 5G.

Accordingly, 5G may be defined as a technology for satisfying the requirements selected for 5G oriented services, such as enhanced mobile broadband (eMBB), massive machine type communication (mMTC,), and ultra-reliable and low-latency communication (URLLC), from among requirements, such as 20 Gbps terminal maximum transmission speed, 500 km/h terminal maximum speed, 0.5 ms maximum delay time, and 1,000,000 UE/km$^2$ terminal connection density.

For example, in order to provide eMBB in 5G, from the viewpoint of one base station, it is required to provide 20 Gbps of terminal maximum transmission speed through a downlink and to provide 10 Gbps terminal maximum transmission speed through an uplink. Further, bodily sensed terminal average transmission speed should be increased. In order to satisfy the requirements as described above, there is a need for improvement of a transmission/reception technology including a more improved MIMO transmission technology.

Also, an mMTC is considered in order to support an application service, such as IoT in 5G. In order to efficiently provide the IoT, the mMTC requires massive terminal connection support in a cell, terminal coverage improvement, improved battery time, and terminal cost reduction. Since the IoT is attached to various sensors and various machines to provide communication functions, it is important to support a large number of terminals (e.g., 1,000,000 UE/km$^2$) in a cell. Further, since there is high possibility that due to the service characteristics of the mMTC, the terminal is located in a shaded area, such as an underground area of a building or an area that cannot be covered by the cell, a wider coverage than the coverage provided by the eMBB is required. There is a high possibility that the mMTC is configured as an inexpensive terminal, and since it is difficult to frequently exchange the battery of the terminal, a very long battery lifetime is required.

The URLLC is a cellular-based wireless communication used for a specific purpose, and is used for remote control of a robot or machine device, industry automation, an unmanned aerial vehicle, remote health care, and emergency situation alarm. Thus, it is important to provide communication having ultra low latency and ultra-reliability. For example, the URLLC should satisfy the maximum delay time shorter than 0.5 ms, and also should provide a packet error rate equal to or lower than $10^{-5}$. Accordingly, for the URLLC, a transmission time interval (TTI) shorter than that of a 5G service, such as eMBB, should be provided, and design requirements in which wide resources should be allocated in the frequency band should be satisfied.

Services considered in the 5G wireless cellular communication system as described above should be provided as one framework. That is, for efficient resource management and control, it is preferable that the services are not independently operated but are integrally controlled and transmitted as one system.

Figure 2:
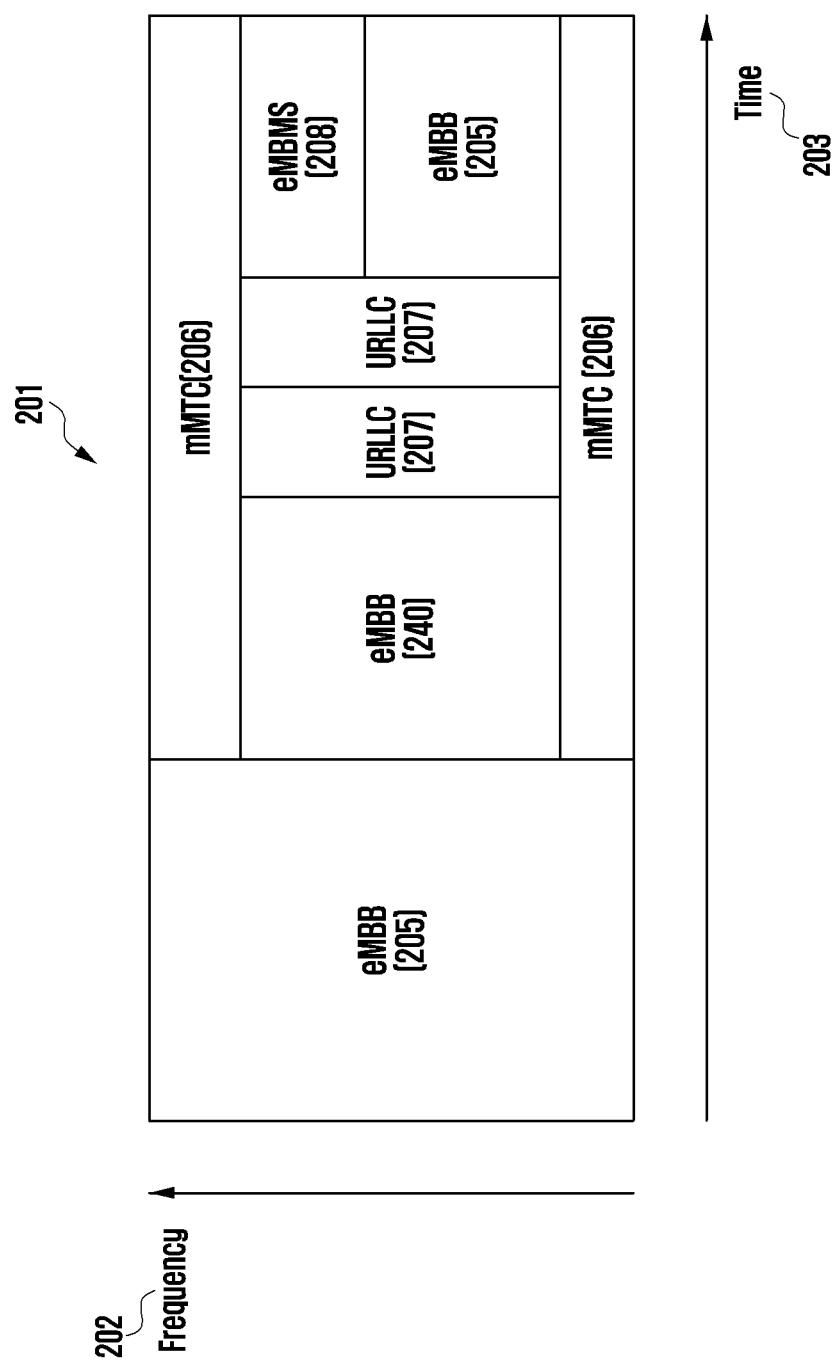
FIG. 2 illustrates 5G services being multiplexed and transmitted in one system.

FIG. 2 illustrates 5G services being multiplexed and transmitted in one system.

Referring to FIG. 2, a frequency-time resource 201 used by 5G includes a frequency axis 202 and a time axis 203. An eMBB 205, an mMTC 206, and a URLLC 207 are operated in one framework. Further, as a service that may be additionally considered in 5G, an enhanced mobile broadcast/multimedia service (eMBMS) 208 for providing cellular-based broadcasting service is provided. Services considered in 5G, such as the eMBB 205, the mMTC 206, the URLLC 207, and the eMBMS 208, may be multiplexed and transmitted through time-division multiplexing (TDM) or frequency division multiplexing (FDM) within one system frequency bandwidth operated in 5G. Further, spatial division multiplexing may be considered.

The eMBB 205 may be transmitted by occupying the maximum frequency bandwidth at a specific time in order to provide the above-mentioned increased data transmission rate. Accordingly, the eMBB 205 service may be TDMed within the system transmission bandwidth 201 with other services and then transmitted. However, the eMBB 205 service can also be FDMed within the system transmission bandwidth with other services according to the needs of other services.

For the mMTC 206, in order to secure a wider coverage than other services, an increased transmission interval is required, and the coverage can be secured through repeated transmission of the same packet in the transmission interval. In order to reduce terminal complexity and terminal costs, the transmission bandwidth that can be received by a terminal is limited. In consideration of such requirements, it is preferable that the mMTC 206 is FDMed with other services in the transmission system bandwidth 201 of the 5G and are transmitted.

In order to satisfy the ultra latency requirement required by a service, the URLLC 207 may have a short TTI as compared to other services. Also, since the URLLC 207 should have a low coding rate in order to satisfy the ultra reliability requirement, it is preferable to have a wide bandwidth on the frequency side. Considering the requirements of the URLLC 207, the URLLC 207 may be TDMed within the transmission system bandwidth 201 of the 5G with other services.

The services described above may have different transmission/reception techniques and transmission/reception parameters to satisfy the requirements of the services. For example, each service may have different numerologies depending on each service requirement. Here, numerology includes a cyclic prefix (CP) length, subcarrier spacing, an OFDM symbol length, a TTI, etc., in a communication system based on OFDM or orthogonal frequency division multiple access (OFDMA).

As an example having different numerologies between the above services, the eMBMS 208 may have a longer CP length than other services. Since the eMBMS 208 transmits broadcast-based upper traffic, the same data may be transmitted in all cells. If the delay of signals received from multiple cells is within the CP length, a terminal can receive and decode all the signals, and thus, can obtain a diversity gain with respect to a single frequency network (SFN). Therefore, a terminal positioned at a cell boundary also has an advantage of receiving broadcasting information without a restriction of coverage. However, since the resource waste due to CP overhead occurs when the CP length is relatively longer than those of other services in supporting the eMBMS in the 5G, an OFDM symbol length that is longer than other services is required, and subcarrier spacing narrower than that of other services is also required.

In addition, as an example where different numerologies are used between services in the 5G, in the URLLC, a shorter OFDM symbol length may be required as a TTI smaller than those of other services is required, and at the same time, larger subcarrier spacing may be required.

One TTI in the 5G may be defined as one slot and may include 14 OFDM symbols or 7 OFDM symbols. Therefore, for 15 KHz subcarrier spacing, one slot has a length of 1 ms or 0.5 ms. Further, for unlicensed band transmission and emergency transmission in 5G, one TTI may be defined as one mini-slot or sub-slot. One mini-slot may have 1 to (the total number of OMDM symbols of a slot)-1 OFDM symbols. If one slot has a length of 14 OFDM symbols, the length of a mini-slot may be determined as one among 1 OFDM symbol to 13 OFDM symbols. The length of the slot or mini-slot may be defined by the standard, or may be transmitted by a higher layer signal or system information and received by a terminal. Further, instead of the mini-slot or sub-slot, the length of a slot may be determined as one among 1 OFDM symbol to 14 OFDM symbols, and the length of the slot may be transmitted by a higher layer signal or system information and received by a terminal.

The slot or mini-slot may be defined to have various transmission formats and may be classified into the following formats.

DL only slot (or full DL slot): The DL only slot includes only a downlink period and supports only downlink transmission.

DL centric slot: The DL centric slot includes a downlink period, a guard period (GP), and an uplink period, and OFDM symbols in the downlink period are more than those of the uplink period.

UL centric slot: The UL centric slot includes a downlink period, a GP, and an uplink period, and OFDM symbols in the downlink period are less than those of the uplink period.

UL only slot (or full UL slot): The UL only slot includes only an uplink period and supports only uplink transmission.

In the description above, only the format of a slot is classified. However, a mini-slot may also be classified in the same classification manner. That is, a mini-slot may be classified into DL only mini-slot, DL centric mini-slot, UL centric mini-slot, and UL only mini-slot.

When the above-described uplink control channel is configured to be transmitted by a terminal within one slot, the terminal may be instructed to use PUCCH format 1, PUCCH format 3, and PUCCH format 4, each of which is an uplink control channel (hereinafter, a long PUCCH) format having a long transmission interval in order to obtain enough cell coverage, or may be instructed to use PUCCH format 0 and PUCCH format 2, each of which is an uplink control channel (hereinafter, a short PUCCH) format having a short transmission interval in order to have a short delay time and enable quick feedback. In the PUCCH formats, enabling or disabling of frequency hopping depends on the frequency hopping configuration of a base station.

The enabling or disabling of frequency hopping refers to whether hopping is enabled or disabled in one slot. Further, if the frequency hopping configuration is not made (no hopping occurs) or the frequency hopping is configured to be disabled, the frequency hopping is not applied. However, if the frequency hopping is configured or the frequency hopping is configured to be enabled, the frequency hopping is applied.

For transmission and reception of an uplink control channel in a slot or mini-slot between a base station and a terminal, the disclosure provides a method in which the base station instructs the terminal on a configuration for transmission of PUCCH format 2, which is a short PUCCH format, and the terminal receives the configuration and transmits the uplink control channel in the slot or mini-slot. A transmission interval (or transmission starting symbol and end symbol) of the uplink control channel may be changed depending on the format of the slot or mini-slot. Uplink control channel multiplexing in one slot or multiple slots is considered so that an uplink control channel (i.e., a short PUCCH) having a short transmission interval for minimizing transmission delay and a long PUCCH exist together in one slot or multiple slots, and a signal for uplink sounding, such as a sounding reference signal (SRS), is transmitted. Therefore, the disclosure provides a method in which, when the base station initializes the DMRS sequence of PUCCH format 2 according to whether frequency hopping is enabled or disabled and the number of transmission symbols, the base station applies a scrambling ID to a DMRS sequence initialization function based on whether PUSCH uplink DMRS mapping type A or PUSCH uplink DMRS mapping type B is configured.

Figure 3A:
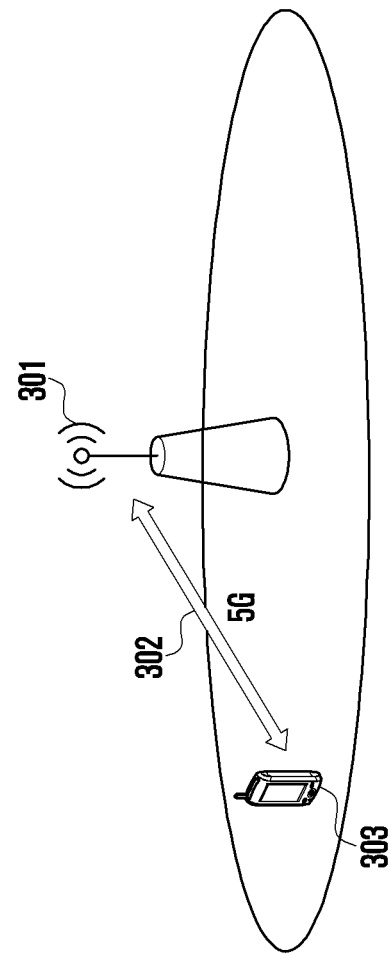
FIG. 3A illustrates a communication system according to an embodiment.

FIG. 3A illustrates a communication system according to an embodiment.

Referring to FIG. 3A, a 5G cell 302 is operated by a base station 301 in a network. A terminal 303 is a 5G-capable terminal having a 5G transmission/reception module. The terminal 303 acquires synchronization through a synchronization signal transmitted in the 5G cell 302, receives system information, and then transmits and receives data to and from the base station 301 through the 5G cell 302. There is no limit to a duplex scheme of the 5G cell 302 (that is, both FDD and time division duplex (TDD) can be supported). When the 5G cell is a P cell, uplink control information is transmitted through the 5G cell 302. In FIG. 3A, the 5G cell may include multiple serving cells and may support a maximum of 16 serving cells. It is assumed that, in the network, the base station 301 includes a 5G transmission/reception module (or system), and the base station 301 can manage and operate the 5G system in real time.

Figure 3B:
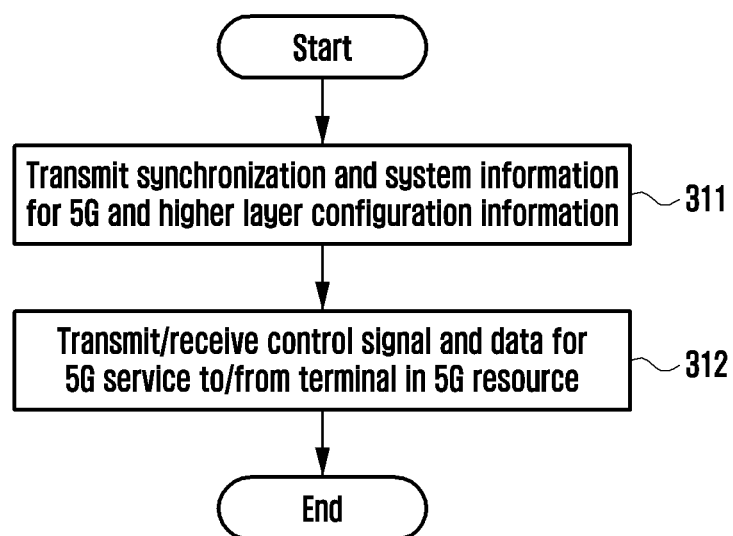
FIG. 3B is a flowchart illustrating an operation of a base station in a communication system according to an embodiment.

FIG. 3B is a flowchart illustrating an operation of a base station in a communication system. Specifically, FIG. 3B illustrates an operation of a base station operating in the communication system of FIG. 3A.

Referring to FIG. 3B, in step 311, the base station 301 transmits, to the 5G-capable terminal 303, synchronization and system information for 5G and higher layer configuration information. The synchronization signal for 5G may be separate synchronization signals for eMBB, mMTC, and URLLC, which use different numerologies, or may be a common synchronization signal on a specific 5G resource using one numerology. The system information may be common system information on a specific 5G resource using one numerology, or may be separate pieces of system information for eMBB, mMTC, and URLLC, which use different numerologies. The system information and the higher layer configuration information may include configuration information regarding whether data transmission/reception is performed based on a slot or a mini-slot, and may include numerology and the number of OFDM symbols of a slot or mini-slot. Further, when downlink common control channel reception is configured for the terminal, the system information and the higher layer configuration information may include configuration information relating to the downlink common control channel reception.

The system information and the higher layer configuration information may include information for transmitting an uplink data channel and an uplink control channel by the terminal. For example, as information for the uplink data channel, PUSCH-Config may include information (dmrs-UplinkForPUSCH-MappingTypeA) for PUSCH uplink DMRS mapping type A configuration, information (dmrs-UplinkForPUSCH-MappingTypeB) for PUSCH uplink DMRS mapping type B configuration, etc. Further, the information for an uplink control channel may include at least one of frequency hopping configuration information, spreading code index information for applying spreading codes in a time domain, transmission starting symbol information, transmission length information, transmission starting PRB information in a frequency domain, information on the number of PRBs, frequency resource information of a second hop when frequency hopping is applied, etc.

In step 312, the base station 301 transmits and receives a control signal and data for a 5G service to and from the 5G-capable terminal 303 in a 5G resource. The control signal includes an uplink control channel including PUCCH format 2, and the base station 301 receives PUCCH format 2 based on configuration information of the uplink control channel configured for the terminal in step 311.

Figure 3C:
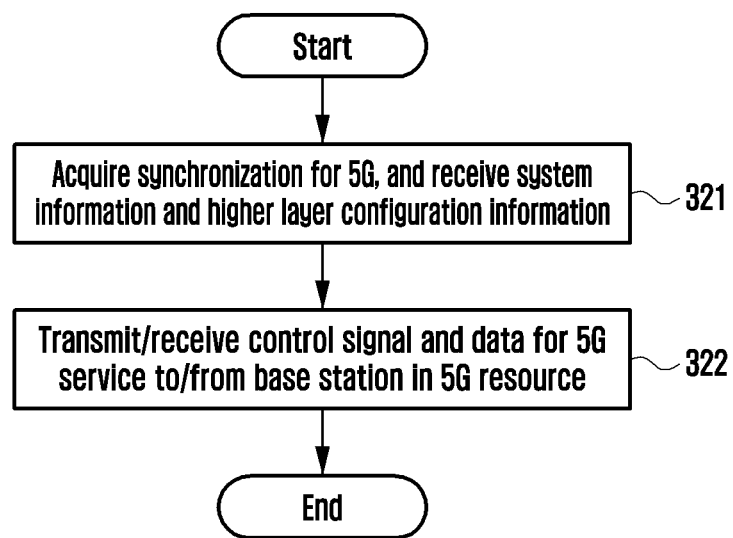
FIG. 3C is a flowchart illustrating an operation of a terminal in a communication system according to an embodiment.

FIG. 3C is a flowchart illustrating an operation of a terminal in a communication system according to an embodiment. Specifically, FIG. 3C illustrates an operation of a terminal operating in the communication system of FIG. 3A.

Referring to FIG. 3C, in step 321, the 5G-capable terminal 303 acquires synchronization from a synchronization signal for a 5G transmitted by the base station 301, and receives higher layer configuration information system information transmitted by the base station 301. The synchronization signal for 5G may be separate synchronization signals for eMBB, mMTC, and URLLC, which use different numerologies, or may be a common synchronization signal on a specific 5G resource using one numerology. The system information may be common system information on a specific 5G resource using one numerology, or may be separate pieces of system information for eMBB, mMTC, and URLLC which use different numerologies. The system information and the higher layer configuration information may include configuration information regarding whether data transmission/reception is performed based on a slot or a mini-slot, and may include numerology and the number of OFDM symbols of a slot or mini-slot.

When downlink common control channel reception is configured for the terminal, the system information and the higher layer configuration information may include configuration information relating to the downlink common control channel reception. The system information and the higher layer configuration information may include information for transmitting uplink data channel and uplink control channel by the terminal. For example, as information for the uplink data channel, PUSCH-Config may include information (dmrs-UplinkForPUSCH-MappingTypeA) for PUSCH uplink DMRS mapping type A configuration, information (dmrs-UplinkForPUSCH-MappingTypeB) for PUSCH uplink DMRS mapping type B configuration, etc. Further, the information for the uplink control channel may include at least one among frequency hopping configuration information, spreading code index information for applying spreading codes in a time domain, transmission starting symbol information, transmission length information, transmission starting PRB information in a frequency domain, information on the number of PRBs, frequency resource information of a second hop when frequency hopping is applied, etc.

In step 322, the 5G-capable terminal 303 transmits and receives a control signal and data for a 5G service to and from the base station 301 in a 5G resource. The control signal includes an uplink control channel including PUCCH format 2, and the terminal 303 transmits PUCCH format 2 based on configuration information of the uplink control channel received from the base station 301.

Figure 4:
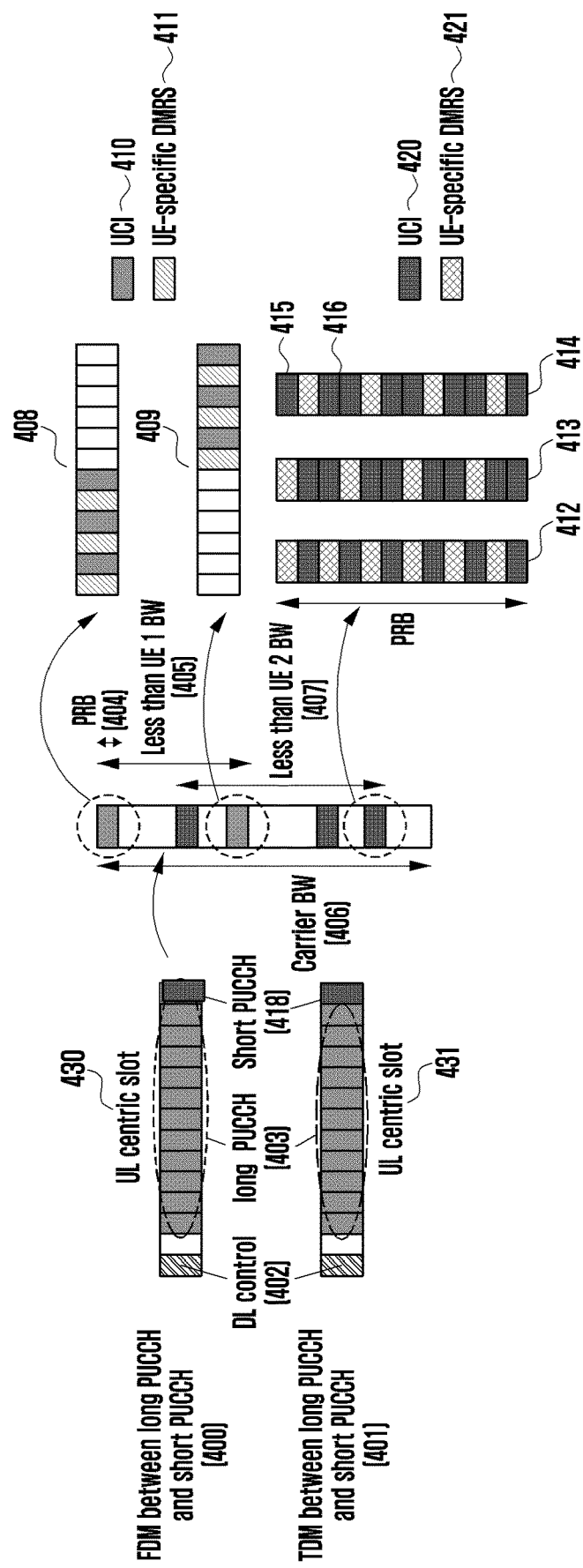
FIG. 4 illustrates a structure of an uplink control channel according to an embodiment.

FIG. 4 illustrates a structure of an uplink control channel according to an embodiment.

Specifically, in FIG. 4, a description is made of a method in which, based on a slot, a terminal determines a transmission interval (or starting symbol and end symbol) of a short PUCCH and transmits an uplink control channel. However, FIG. 4 may be also applied where, based on a mini-slot, the terminal determines a transmission interval (or starting symbol and end symbol) of a short PUCCH and transmits an uplink control channel.

Referring to FIG. 4, the long PUCCH and the short PUCCH are multiplexed in the frequency domain (FDM, 400) or are multiplexed in the time domain (TDM, 401).

Reference numerals 420 and 421 show uplink centric slots (UL centric slots) in a basic transmission unit of 5G, i.e., a slot. Various names, such as subframe or TTI can be used. In the disclosure, a basic transmission unit is referred to as a slot.

In the UL centric slots, most OFDM symbols are used as an uplink transmission interval, and all OFDM symbols can be used for uplink transmission. Alternatively, several OFDM symbols can be used for downlink transmission. If there are uplink and downlink intervals together in one slot, a transmission gap may exist therebetween.

In FIG. 4, a first OFDM symbol in one slot is used for the downlink transmission, e.g., downlink control channel transmission 402, and symbols starting from a third OFDM symbol are used for the uplink transmission. A second OFDM symbol is used as a transmission gap. In the uplink interval, uplink data channel transmission and uplink control channel transmission are possible.

Next, a long PUCCH 403 will be described. Since a control channel at a long transmission interval is used for making a cell coverage large, the control channel may be transmitted in a discrete Fourier transform-spread-OFDM (DFT-S-OFDM) scheme, which is single carrier transmission, rather than OFDM transmission. Therefore, in this instance, only continuous subcarriers are required to be used to transmit a PUCCH. Further, frequency hopping may be configured in order to obtain the frequency diversity effect. That is, if the frequency hopping is applied (if the frequency hopping is enabled by a higher layer signal), the terminal may configure an uplink control channel of a long transmission interval based on a resource spaced apart from the frequency axis, like reference numerals 408 and 409. If the frequency hopping is not applied (if the frequency hopping is disabled by a higher layer signal), a long PUCCH may be transmitted during a transmission symbol interval of the long PUCCH at a frequency position (that is, a frequency position by information on the number of PRBs and transmission starting PRB information configured in a higher layer signal).

A spaced distance 405 on the frequency axis should be smaller than a bandwidth supported by the terminal, and the long PUCCH 403 may be transmitted using PRB-1, like reference numeral 408, in a front part of the slot, and may be transmitted using PRB-2, like reference numeral 409, in a rear part of the slot. The PRB described above is a physical resource block, which corresponds to a minimum transmission unit at the frequency side and may be defined as 12 subcarriers, etc. Therefore, a distance of PRB-1 and PRB-2 in terms of frequency should be smaller than the maximum support bandwidth of the terminal, and the maximum support bandwidth of the terminal may be less than or equal to a bandwidth 406 supported by the system. Further, each of the control channel transmitted in the front part of the slot of reference numeral 408 and the control channel transmitted in the rear part of the slot of reference numeral 409 includes uplink control information (UCI) corresponding to reference numeral 410 and a terminal reference signal 411. It is assumed that the two signals are temporally distinguished and transmitted in different OFDM symbols The long PUCCH 403 supports transmission formats, such as PUCCH format 1, PUCCH format 3, and PUCCH format 4, according to the number of supportable control information bits and whether terminal multiplexing is supported through pre-DFT orthogonal cover code (OCC) support at pre-inverse fast Fourier transform (IFFT) node.

PUCCH format 1 is a long PUCCH format based on DFT-S-OFDM, which can support control information of up to 2 bits. The control information may include HARQ-ACK and a scheduling request (SR), alone or in combination. PUCCH format 1 repeatedly includes OFDM symbols including a DMRS and OFDM symbols including UCI. If the number of transmission symbols of PUCCH format 1 is 8, the PUCCH includes a DMRS symbol, a UCI symbol, a DMRS symbol, a UCI symbol, a DMRS symbol, a UCI symbol, a DMRS symbol, and a UCI symbol in order, starting from a first starting symbol of eight symbols.

The DMRS symbol spreads, in the time axis, a sequence corresponding to a length of 1 RB in the frequency axis in one OFDM symbol by using an orthogonal code (or orthogonal sequence or spreading code, $W_i(m)$), and is transmitted after performing IFFT. The UCI symbol generates d(0) by binary phase shift keying (BPSK)-modulating 1-bit control information and QPSK-modulating 2-bit control information, multiplies the generated d(0) and a sequence corresponding to a length of 1 RB in the frequency axis together and scrambles the sequence, spreads the scrambled sequence in the time axis by using an orthogonal code (or orthogonal sequence or spreading code, $W_i(m)$), and is transmitted after performing IFFT. The terminal generates a sequence based on group hopping or sequence hopping configured by a higher layer signal from the base station and a configured 1D, and cyclic-shifts the generated sequence by an initial cyclic shift (CS) value configured by the higher layer signal to generate a sequence corresponding to a length of 1 RB.

$W_i(m)$ may be provided, as shown in Table 2 below, according to the spreading code length ($N_{SF}$). In Table 2, i refers to an index of spreading code itself, and m refers to an index of spreading code elements. The numbers between the square brackets ([ ]) in Table 2 (spreading code $$w_i(m) = e^{j2\pi\varphi(m)/N_{SF}}$$

for PUCCH format 1) refer to φ(m). If the spreading code length is 2 and index i of the spreading code is 0, $W_i(m)$ corresponds to $$w_i(0) = e^{j2\pi 0/N_{SF}} = 1, w_i(1) = e^{j2\pi 0/N_{SF}} = 1,$$

and $w_i(m)=[1\ 1]$.

A short PUCCH 418 may be transmitted at both a downlink centric slot and an uplink centric slot, and is generally transmitted at the last symbol of a slot or at an OFDM symbol at the rear part thereof (e.g., the last OFDM symbol, the next to last OFDM symbol, or the last two OFDM symbols). Further, the short PUCCH 418 may be transmitted at a random position in a slot. The short PUCCH 418 can be transmitted by using one OFDM symbol or two OFDM symbols.

TABLE 2

| | φ (m) | | | | | | |
|---|---|---|---|---|---|---|---|
| $N_{SF}$ i = 0 | i = 1 | i = 2 | i = 3 | i = 4 | i = 5 | i = 6 | |
| 1 [0] | — | — | — | — | — | — | |
| 2 [0 0] | [0 1] | — | — | — | — | — | |
| 3 [0 0 0] | [0 1 2] | [0 2 1] | — | — | — | — | |
| 4 [0 0 0 0] | [0 2 0 2] | [0 0 2 2] | [0 2 2 0] | — | — | — | |
| 5 [0 0 0 0 0] | [0 1 2 3 4] | [0 2 4 1 3] | [0 3 1 4 2] | [0 4 3 2 1] | — | — | |
| 6 [0 0 0 0 0 0] | [0 1 2 3 4 5] | [0 2 4 0 2 4] | [0 3 0 3 0 3] | [0 4 2 0 4 2] | [0 5 4 3 2 1] | — | |
| 7 [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] | |

PUCCH format 3 is a long PUCCH format based on DFT-S-OFDM, which can support control information exceeding 2 bits. The control information may include HARQ-ACK, channel state information (CSI), and an SR, alone or in combination.

The position of a DMRS symbol in PUCCH format 3 may be provided, as shown in Table 3 below, according to whether frequency hopping is configured or whether an additional DMRS symbol is configured.

In FIG. 4, the short PUCCH 418 is transmitted at the last symbol of the UL centric slots 430 and 431. A wireless resource for the short PUCCH 418 is allocated in a PRB unit at a frequency side. One PRB or multiple continuous PRBs may be allocated, and multiple PRBs spaced from a frequency band may be allocated. The allocated PRB is required to be included in a band equal to or smaller than a frequency band 407 supported by a terminal.

TABLE 3

| | DMRS position in PUCCH format ¾ transmission | | | |
|---|---|---|---|---|
| | No additional DMRS configured | | Additional DMRS configured | |
| PUCCH format ¾ transmission length | Frequency hopping not configured | Frequency hopping configured | Frequency hopping not configured | Frequency hopping configured |
| 4 | 1 | 0, 2 | 1 | 0, 2 |
| 5 | 0, 3 | | 0, 3 | |
| 6 | 1, 4 | | 1, 4 | |
| 7 | 1, 4 | | 1, 4 | |
| 8 | 1, 5 | | 1, 5 | |
| 9 | 1, 6 | | 1, 6 | |
| 10 | 2, 7 | | 1, 3, 6, 8 | |
| 11 | 2, 7 | | 1, 3, 6, 9 | |
| 12 | 2, 8 | | 1, 4, 7, 10 | |
| 13 | 2, 9 | | 1, 4, 7, 11 | |
| 14 | 3, 10 | | 1, 5, 8, 12 | |

If the number of transmission symbols of PUCCH format 3 is 8, staring from a first starting symbol of the 8 symbols as 0, DMRS is transmitted in a first symbol and a fifth symbol. Table 3 is also applied to the DMRS symbol position of PUCCH format 4 in the same manner.

PUCCH format 4 is a long PUCCH format based on DFT-S-OFDM, which can support control information exceeding 2 bits. The control information may include HARQ-ACK, CSI, and an SR, alone or in combination. PUCCH format 4 differs from PUCCH format 3 in that, in PUCCH format 4, multiple terminals can be multiplexed within one RB. PUCCH format 4 of the multiple terminals can be multiplexed by applying pre-DFT OCC to control information at a pre-IFFT node. The number of transmittable control information symbols of one terminal is reduced according to the number of multiplexed terminals.

In one PRB, uplink control information 416 and 420 and demodulation reference signals 415 and 421 are multiplexed in the frequency band. It is possible to apply a method for transmitting a demodulation reference signal to one subcarrier per every two symbols as in reference numeral 412, a method for transmitting a demodulation reference signal to one subcarrier per every three symbols as in reference numeral 413, or a method for transmitting a demodulation reference signal to one subcarrier at the center per every three symbol as in reference numeral 414.

The method to be used among the demodulation reference signal transmission methods, such as reference numerals 412, 413, and 414, may be configured by a higher layer signal. As one of the mapping methods is defined in the standards, the terminal may transmit a short PUCCH according to the mapping method and the base station may demodulate the short PUCCH according to the mapping method. Alternatively, the terminal multiplexes a DMRS and uplink control information according to a method indicated through the reception of a higher layer signal and then transmits the multiplexed demodulation reference signal and uplink control information. The method for transmitting a DMRS may be determined according to the number of bits of uplink control information 420. If the number of bits of uplink control information is small, the terminal may transmit a PUCCH by using a method for multiplexing a demodulation reference signal and uplink control information as in reference numeral 412. If the number of bits of the uplink control information is small, a sufficient transmission code rate may be obtained without using many resources for transmission of the uplink control information. If the number of bits of uplink control information is large, the terminal may transmit a PUCCH by using a method for multiplexing a demodulation reference signal and uplink control information as in reference numeral 414. If the number of bits of the uplink control information is large, it is necessary to use many resources for transmission of the uplink control information in order to reduce a transmission code rate.

The short PUCCH 418 supports transmission formats, such as PUCCH format 0 and PUCCH format 2, according to the number of supportable control information bits. PUCCH format 0 is a short PUCCH format based on CP-OFDM, which can support control information of up to 2 bits. The control information may include HARQ-ACK and an SR, alone or in combination. According to PUCCH format 0, a DMRS is not transmitted and only sequences mapped to 12 subcarriers to the frequency axis within one OFDM symbol are transmitted. The terminal generates a sequence based on group hopping or sequence hopping configured by a higher layer signal from the base station and a configured ID, cyclic-shifts the generated sequence by a final CS value obtained by adding another CS value to an indicated initial CS value according to ACK or NACK, maps the cyclic-shifted sequence to 12 subcarriers, and transmits the mapped sequence. If HARQ-ACK is one bit and is an ACK, as shown in Table 4 below, a final CS is generated by adding 6 to an initial CS value, and if the HARQ-ACK is a NACK, a final CS is generated by adding 0 to an initial CS. 0 (a CS value for the NACK) and 6 (a CS value for the ACK) are defined in the standards, and thus, the terminal generates PUCCH format 0 according to the above values and transmits 1-bit HARQ-ACK.

TABLE 4

| 1-bit HARQ-ACK | NACK | ACK |
| --- | --- | --- |
| Final CS | (initial CS + 0) mod 12 = initial CS | (initial CS + 6) mod 12 |

If HARQ-ACK is 2 bits, as shown in Table 5, 0 is added to an initial CS value for (NACK, NACK), 3 is added to the initial CS value for (NACK, ACK), 6 is added to an initial CS value for (ACK, ACK), and 9 is added to the initial CS value for (ACK, NACK). 0 is a CS value for the (NACK, NACK), 3 is a CS value for the (NACK, ACK), 6 is a CS value for the (ACK, ACK), and 9 is the CS value for the (ACK, NACK) and are defined in the standards, and thus, the terminal generates PUCCH format 0 according to the above values and transmits 2-bit HARQ-ACK.

In the above description, if the final CS value exceeds 12 by a CS value added to the initial CS value according to ACK or NACK, the length of a sequence is 12 and modulo 12 may be applied.

TABLE 5

| 2-bit HARQ-ACK | NACK, NACK | NACK, ACK | ACK, ACK | ACK, NACK |
| --- | --- | --- | --- | --- |
| Final CS | (initial CS + 0) mod 12 = initial CS | (initial CS + 3) mod 12 | (initial CS + 6) mod 12 | (initial CS + 9) mod 12 |

PUCCH format 2 is a short PUCCH format based on CP-OFDM, which can support control information exceeding 2 bits. The control information may include HARQ-ACK, CSI, and an SR, alone or in combination. In PUCCH format 2, when the index of a first subcarrier is #0, like reference numeral 414 in FIG. 4, a subcarrier having the index of #1, #4, #7, or #10 is fixed as a subcarrier to which a DMRS is transmitted in one OFDM symbol. The control information goes through a modulation process after channel encoding and is mapped to the remaining subcarriers, except for the subcarrier at which DMRS is positioned.

A sequence for the DMRS may be generated as shown in Equation (1).

$$r(m) = \frac{1}{\sqrt{2}}(1 - 2*c(2m)) + j*\frac{1}{\sqrt{2}}(1 - 2*c(2m+1)), m = 0, 1, \ldots \quad (1)$$

In Equation (1), c(i) is a Gold sequence having a length of 31, and the Gold sequence may be initialized using Equation (2).

$$c_{init} = \left(2^{17}\left(14n_{s,f}^{\mu} + l + 1\right)\left(2N_{ID}^0 + 1\right) + 2N_{ID}^0\right)\bmod 2^{31} \quad (2)$$

In Equation (2), l is OFDM symbol number (i.e., OFDM symbol index) of PUCCH format 2. If a PUCCH format 2 corresponding to a PUCCH resource indicated from the base station includes two symbols, l indicates a first OFDM symbol number of PUCCH format 2. If PUCCH format 2 includes one symbol, l indicates a number of the symbol constituting PUCCH format 2. $n_{s,f}^{\mu}$ is a slot number (i.e., a slot index) in which PUCCH format 2 is transmitted in a radio frame, $N_{ID}^0$ is $N_{ID}^0 \in \{0, 1, \ldots, 65535\}$, $N_{ID}^0$ is provided by a higher layer signal, i.e., scramblingID0, and the scramblingID0 is included in DMRS-UplinkConfig IE, which is a higher layer signal. DMRS-UplinkConfig IE is included in dmrs-UplinkForPUSCH-MappingTypeA and dmrs-UplinkForPUSCH-MappingTypeB, which are higher layer signals. If there is no scramblingID0, $N_{ID}^0$ is $N_{ID}^{cell}$, which is a cell ID value.

Table 6 below shows dmrs-UplinkForPUSCH-MappingTypeA and dmrs-UplinkForPUSCH-MappingTypeB, which are included in PUSCH-Config that is a higher layer signal.

TABLE 6

-- PUSCH-Config information element
The IE PUSCH-Config is used to configure the UE specific PUSCH parameters applicable to a particular BWP.
                        PUSCH-Config information element
-- ASN1START
-- TAG-PUSCH-CONFIG-START
PUSCH-Config ::=                    SEQUENCE {
    dataScramblingIdentityPUSCH     INTEGER (0..1023)                           OPTIONAL,       -- Need M
    txConfig                        ENUMERATED {codebook, nonCodebook}          OPTIONAL,       -- Need S
    dmrs-UplinkForPUSCH-            SetupRelease { DMRS-UplinkConfig }          OPTIONAL,       -- Need M
    MappingTypeA
    dmrs-UplinkForPUSCH-            SetupRelease { DMRS-UplinkConfig }          OPTIONAL,       -- Need M
    MappingTypeB
    pusch-PowerControl              PUSCH-PowerControl                          OPTIONAL, -- Need M
    frequencyHopping                ENUMERATED {mode1, mode2}                   OPTIONAL,       -- Need S
    frequencyHoppingOffsetLists     SEQUENCE (SIZE (1..4)) OF INTEGER (1.. maxNrofPhysicalResourceBlocks-1)
    OPTIONAL,       -- Need M
    resourceAllocation              ENUMERATED { resourceAllocationType0, resourceAllocationType1, dynamicSwitch},
    pusch-TimeDomainAllocationList  SetupRelease { PUSCH-TimeDomainResourceAllocationList }   OPTIONAL,
    -- Need M
    pusch-AggregationFactor         ENUMERATED { n2, n4, n8 }                   OPTIONAL,       -- Need S
    mcs-Table                       ENUMERATED {qam256, spare1}                 OPTIONAL,       -- Need S
    mcs-Table TransformPrecoder     ENUMERATED {qam256, spare1}                 OPTIONAL,       -- Need S
    transformPrecoder               ENUMERATED {enabled, disabled}              OPTIONAL,       -- Need S
    codebookSubset                  ENUMERATED    {fullyAndPartialAndNonCoherent,       partialAndNonCoherent,
nonCoherent}            OPTIONAL,       -- Cond codebook Based
    maxRank                         INTEGER (1..4)                      OPTIONAL,       -- Cond codebookBased
    rbg-Size                        ENUMERATED { config2}               OPTIONAL,       -- Need S Table 7 below shows scramblingID0 included in DMRS-UplinkConfig.

TABLE 7

DMRS-UplinkConfig ::=           SEQUENCE {
    dmrs-Type                   ENUMERATED {type2}              OPTIONAL,   -- Need S
    dmrs-AdditionalPosition     ENUMERATED {pos0, pos1, pos3}   OPTIONAL,   -- Need R
    phaseTrackingRS             SetupRelease { PTRS-UplinkConfig } OPTIONAL, -- Need M
    maxLength                   ENUMERATED {len2}               OPTIONAL,   -- Need S
    transformPrecodingDisabled  SEQUENCE {
        serambingID0            INTEGER (0..65535)              OPTIONAL,   -- Need S
        scramblingID1           INTEGER (0..65535)              OPTIONAL,   -- Need S
        ...
    }                                                           OPTIONAL,   -- Need R
    transformPrecodingEnabled   SEQUENCE {
        nPUSCH-Identity         INTEGER(0..1007)                OPTIONAL,   -- Need S
        disableSequenceGroupHopping  ENUMERATED {disabled}      OPTIONAL,   -- Need S
        sequenceHoppingEnabled  ENUMERATED {enabled}            OPTIONAL,   -- Need S
        ...
    }                                                           OPTIONAL,   -- Need R
    ...
}

A terminal receives, through a higher layer signal, a configuration of PUCCH resource sets. The terminal selects the configured PUCCH resource sets according to the number of control information bits. In a specific slot, the terminal selects PUCCH resource set 0 when the number of control information bits to be transmitted ranges from 1 to 2, selects PUCCH resource set 1 when the number of control information bits to be transmitted ranges from 3 to $N_2-1$, selects PUCCH resource set 2 when the number of control information bits to be transmitted ranges from $N_2$ to $N_3-1$, and selects PUCCH resource set 3 when the number of control information bits to be transmitted ranges from $N_3$ to $N_4-1$. $N_2$, $N_3$, and $N_4$ all are higher layer signals and may be received by the terminal from the base station in advance.

Each PUCCH resource set includes X PUCCH resources, and X PUCCH resources include a resource for the short PUCCH (PUCCH format 0, PUCCH format 2) or a resource for the long PUCCH (PUCCH format 1, PUCCH format 3, PUCCH format 4). That is, each of the configured PUCCH resources includes all pieces of information for transmitting a PUCCH according to a specific PUCCH format (PUCCH format 0, PUCCH format 1, PUCCH format 2, PUCCH format 3, or PUCCH format 4), and the PUCCH resources may be configured to transmit different PUCCH formats. X is a constant and may be differently configured through a higher layer signal according to PUCCH resource sets. That is, X=32 in PUCCH resource set 0, and X=8 in the remaining PUCCH resource sets 1, 2, and 3.

A resource, which is to be selected by a terminal from among X resources, and a PUCCH format, which corresponds to the selected resource and is to be transmitted by the terminal, may be instructed through bits of downlink control information, or may be induced through a transmission resource or slot index of a downlink control channel, a unique ID of the terminal, etc. Otherwise, a mixed method including the instruction through the downlink control information and the induction through a transmission resource or slot index of a downlink control channel, a unique ID of the terminal, etc., may be used to instruct the terminal.

As described above, through the instruction method or induction method, the terminal selects one PUCCH resource from among X PUCCH resources and transmits control information through the PUCCH format. The PUCCH resource instruction method may be applied, e.g., HARQ-ACK transmission, only when the terminal can determine a PUCCH resource through the corresponding downlink control channel reception prior to the HARQ-ACK transmission. Whereas, like CSI or SR transmission, if there is no corresponding downlink control channel reception prior to the CSI or SR transmission, the terminal may receive PUCCH formats to be used or PUCCH resources for the CSI or SR transmission from the base station through a higher layer signal. According to a period and offset configured by the higher layer signal from the base station, the terminal transmits CSI or SR by using the configured PUCCH formats in the configured PUCCH resources configured in a slot for the CSI or SR transmission.

Each of the PUCCH resources corresponding to the PUCCH formats includes at least one of:

PUCCH transmission starting symbol, and the number of PUCCH transmission symbols An index indicating a starting PRB, the number of transmission PRBs, enabling or disabling of frequency hopping, and a frequency resource of a second hop when frequency hopping is instructed An initial CS value, an index of time domain CC the length of a pre-DFT OCC, and an index of a pre-DFT OCC Information and value ranges required according to the PUCCH formats may be provided as shown in Table 8 below. In Table 8, N.A. is shown if the range of a value is unnecessary because the value is not necessary to configure or is 1.

induced from a base station, is used to transmit a specific PUCCH format corresponding to the PUCCH resource.

Hereinafter, a description will be made of an example in which the long PUCCH and the short PUCCH, described above, are multiplexed.

In one slot, a long PUCCH and a short PUCCH for different terminals may be multiplexed in the frequency domain. A base station may configure short PUCCH and long PUCCH frequency resources for the different terminals so as not to overlap each other as in the PRB of FIG. 4. However, considering that limited frequency resources are used for uplink data channel transmission, compared to uplink control channel transmission, differently configuring uplink control channel transmission resources of all the terminals, regardless of scheduling, causes frequency waste and is not preferable.

Therefore, the short PUCCH and long PUCCH frequency resources for the different terminals may overlap each other, and the base station may be required to control scheduling and transmission resources for the different terminals so as not to collide with each other in one slot. However, if a short PUCCH transmission resource and a long PUCCH transmission resource for the different terminals unavoidably collide with each other in one slot, the base station is required to prevent the long PUCCH transmission resource from colliding with the short PUCCH transmission resource, and the terminals are required to adjust the long PUCCH transmission resource according to the instruction of the base station. Through the method, the short PUCCH and long PUCCH transmission resources may be multiplexed in the time domain in one slot.

TABLE 8

| | | PUCCH format 0 | PUCCH format 1 | PUCCH format 2 | PUCCH format 3 | PUCCH format 4 |
|---|---|---|---|---|---|---|
| Starting symbol | Configurability | √ | √ | √ | √ | √ |
| | Value range | 0-13 | 0-10 | 0-13 | 0-10 | 0-10 |
| Number of symbols in a slot | Configurability | √ | √ | √ | √ | √ |
| | Value range | 1, 2 | 4-14 | 1, 2 | 4-14 | 4-14 |
| Index for identifying starting PRB | Configurability | √ | √ | √ | √ | √ |
| | Value range | 0-274 | 0-274 | 0-274 | 0-274 | 0-274 |
| Number of PRBs | Configurability | N.A. | N.A. | √ | √ | N.A. |
| | Value range | N.A. (Default is 1) | N.A. (Default is 1) | 1-16 | 1-6, 8-10, 12, 15, 16 | N.A. (Default is 1) |
| Enabling a FH | Configurability | √ | √ | √ | √ | √ |
| | Value range | On/Off (only for 2 symbol) | On/Off | On/Off (only for 2 symbol) | On/Off | On/Off |
| Frequency resource of 2$^{nd}$ hop if FH is enabled | Configurability | √ | √ | √ | √ | √ |
| | Value range | 0-274 | 0-274 | 0-274 | 0-274 | 0-274 |
| Index of initial cyclic shift) | Configurability | √ | √ | N.A. | N.A. | N.A. |
| | Value range | 0-11 | 0-11 | N.A. | 0-11 | 0-11 |
| Index of time-domain OCC | Configurability | N.A. | √ | N.A. | N.A. | N.A. |
| | Value range | N.A. | 0-6 | N.A. | N.A. | N.A. |
| Length of Pre-DFT OCC | Configurability | N.A. | N.A. | N.A. | N.A. | √ |
| | Value range | N.A. | N.A. | N.A. | N.A. | 2, 4 |
| Index of Pre-DFT OCC | Configurability | N.A. | N.A. | N.A. | N.A. | √ |
| | Value range | N.A. | N.A. | N.A. | N.A. | 0, 1, 2, 3 |

In the description below, a short PUCCH refers to PUCCH format 0 or PUCCH format 2 unless otherwise specified, and a long PUCCH refers to PUCCH format 1, PUCCH format 3, or PUCCH format 4 unless otherwise specified. Further, unless otherwise specified, a transmission through PUCCH format X indicates that a PUCCH obtained through the method of the disclosure, which is instructed or Various embodiments will be described below including a method for applying, when initializing a DMRS sequence of PUCCH format 2 as described in Equation (2), scramblingID0 to a DMRS sequence initialization function based on whether PUSCH uplink DMRS mapping type A or PUSCH uplink DMRS mapping type B is configured.

However, before the embodiments are described, the PUSCH uplink DMRS mapping type A and the PUSCH uplink DMRS mapping type B will be described in detail.

The PUSCH uplink DMRS mapping type A is a configuration in which a terminal transmits a PUSCH through a first OFDM symbol as a starting symbol in one slot, and the terminal may receive, from a base station through a PDCCH, an instruction to transmit the PUSCH at transmission interval of 4 symbols to 14 symbols. The terminal may receive the configuration of the PUSCH uplink DMRS mapping type A from the base station through dmrs-UplinkForPUSCH-MappingTypeA, which is a higher layer signal.

The PUSCH uplink DMRS mapping type B is a configuration in which the terminal transmits a PUSCH by using a symbol indicated by a PDCCH as a starting symbol without any limitation in one slot, and the terminal may receive, from the base station through a PDCCH, an instruction to transmit the PDSCH at the transmission interval of 1 symbol to 14 symbols. The terminal may receive the configuration of the PUSCH uplink DMRS mapping type B from the base station through dmrs-UplinkForPUSCH-MappingTypeB, which is a higher layer signal.

Whether the terminal uses DFT-S-OFDM or uses CP-OFDM at the time of the PUSCH transmission is configured from transformPrecoder of PUSCH-Config. That is, if the transformPrecoder is enabled, the DFT-S-OFDM is used to transmit a PUSCH, and, if the transformPrecoder is disabled, the CP-OFDM is used to transmit a PUSCH. If the transformPrecoder is not configured, the terminal determines whether to use DFT-S-OFDM or to use CP-OFDM according to a value of msg3-tp included in system information.

A DMRS sequence for channel estimation of a PUSCH at the time PUSCH transmission may be generated as shown in Equation (3).

$$r(n) = \frac{1}{\sqrt{2}}(1-2*c(2n)) + j*\frac{1}{\sqrt{2}}(1-2*c(2n+1)) \quad (3)$$

In Equation (3), c(i) is a Gold sequence having a length of 31, and the Gold sequence may be initialized using Equation (4).

$$c_{init} = \left(2^{17}\left(N_{symb}^{slot}n_{s,f}^{\mu} + l + 1\right)\left(2N_{ID}^{n_{SCID}} + 1\right) + 2N_{ID}^{n_{SCID}} + n_{SCID}\right) \bmod 2^{31} \quad (4)$$

In Equation (4), $N_{symb}^{slot}$ is the number of OFDM symbols per one slot, and is 14 in a normal CP and is 12 in an extended CP. l is an OFDM symbol number (i.e., OFDM symbol index) of a PUSCH in a slot. That is, l refers to the index of an OFDM symbol from which the PUSCH starts. $n_{s,f}^{\mu}$ is a slot number (i.e., a slot index) in which the PUSCH is transmitted in a radio frame.

If the PUSCH is scheduled by DCI format 0_1, $$N_{ID}^0, N_{ID}^1 \in \{0, 1, \ldots, 65535\}$$

is provided by scramblingID0 and scramblingID1, which are higher layer signals, respectively, and the scramblingID0 and the scramblingID1 are included in DMRS-UplinkConfig IE which is a higher layer signal. The DMRS-UplinkConfig IE is included in dmrs-UplinkForPUSCH-MappingTypeA and dmrs-UplinkForPUSCH-MappingTypeB, which are higher layer signals.

If the PUSCH is scheduled by DCI format 0_0, $N_{ID}^0$ is $$N_{ID}^0 \in \{0, 1, \ldots, 65535\},$$

$N_{ID}^0$ is provided by scramblingID0, which is a higher layer signal, and the scramblingID0 is included in DMRS-UplinkConfig IE which is a higher layer signal. The DMRS-UplinkConfig IE is included in dmrs-UplinkForPUSCH-MappingTypeA and dmrs-UplinkForPUSCH-MappingTypeB, which are higher layer signals.

In the other cases, $N_{ID}^0$ is $N_{ID}^{cell}$, which is a cell ID value.

$$n_{SCID} \in \{0, 1\}$$

is given in a DMRS initialization field of DCI format 0_1 which schedules PUSCH transmission when the terminal receives a PUSCH. If the transformPrecoder, which is a higher layer signal, is disabled and the scramblingID0 and the scrambllingID1 are configured in the DMRS-UplinkConfig, the DMRS initialization field has a value of 1 bit and indicates whether $n_{SCID}$ is 0 or 1. If the transformPrecoder, which is a higher layer signal, is enabled, the DMRS initialization field includes 0 bit and $n_{SCID}$ is 0.

Therefore, in a PUSCH transmission, a method for the DMRS sequence initialization is determined by a DCI format which schedules a PUSCH. However, in PUCCH format 2 transmission, a DMRS initialization method is required in performing periodic channel information transmission configured by a higher layer signal or HARQ-ACK transmission as feedback to the PUSCH.

Either the PUSCH uplink DMRS mapping type A or the PUSCH uplink DMRS mapping type B may be configured for a terminal through a higher layer signal, and both of them may be configured for the terminal through a higher layer signal. Various embodiments will provide a method for applying scramblingID0 to a DMRS sequence initialization function for transmitting PUCCH format 2 based on whether the PUSCH uplink DMRS mapping type A or the PUSCH uplink DMRS mapping type B is configured.

Embodiment 1

In Embodiment 1, a method is provided for applying DMRS sequence initialization for PUCCH format 2 based on at least one PUSCH uplink DMRS mapping type, the configuration of which has been received from a base station.

If a terminal has received a configuration of the PUSCH uplink DMRS mapping type A through dmrs-UplinkForPUSCH-MappingTypeA, which is a higher layer signal, and has failed to receive a configuration of dmrs-UplinkForPUSCH-MappingTypeB, the terminal applies, to $N_{ID}^0$ of Equation (2), a value configured in scramblingID0 included in DMRS-UplinkConfig IE of the dmrs-UplinkForPUSCH-MappingTypeA for DMRS sequence initialization for transmitting PUCCH format 2.

If the terminal has received a configuration of the PUSCH uplink DMRS mapping type B through dmrs-UplinkForPUSCH-MappingTypeB, which is a higher layer signal, and has failed to receive a configuration of dmrs-UplinkFor- PUSCH-MappingTypeA, the terminal applies, to $N_{ID}^0$ of Equation (2), a value configured in scramblingID0 included in DMRS-UplinkConfig IE of dmrs-UplinkForPUSCH-MappingTypeB for DMRS sequence initialization for transmitting PUCCH format 2.

If the terminal has received two PUSCH uplink DMRS mapping types from a higher layer signal, i.e., has received a configuration of the PUSCH uplink DMRS mapping type A through dmrs-UplinkForPUSCH-MappingTypeA, which is a higher layer signal, and a configuration of the PUSCH uplink DMRS mapping type B through dmrs-UplinkForPUSCH-MappingTypeB, a description of operations of the terminal will be made below.

As a first operation method, the terminal applies, to $N_{ID}^0$ of Equation (2), a value configured in scramblingID0 included in DMRS-UplinkConfig IE of the dmrs-UplinkForPUSCH-MappingTypeA for DMRS sequence initialization for transmitting PUCCH format 2. Since the PUSCH uplink DMRS mapping type A is slot-based transmission, the first operation method is possible as a fallback.

As a second operation method, the terminal applies, to $N_{ID}^0$ of Equation (2), a value configured in scramblingID0 included in DMRS-UplinkConfig IE of the dmrs-UplinkForPUSCH-MappingTypeB for DMRS sequence initialization for transmitting PUCCH format 2. In this instance, PUCCH format 2 has a transmission length of one OFDM symbol or two OFDM symbols, and considering that PUCCH format 2 transmission is possible in any symbol in a slot, it may be reasonable to apply the PUSCH uplink DMRS mapping type B.

A third operation method is to apply DMRS initialization in another uplink DMRS mapping type according to the position of a starting symbol of PUCCH format 2. If a first OFDM symbol of a specific slot is indicated as a transmission starting symbol of PUCCH format 2, the terminal may apply, to $N_{ID}^0$ of Equation (2), a value configured in scramblingID0 included in DMRS-UplinkConfig IE of the dmrs-UplinkForPUSCH-MappingTypeA for DMRS sequence initialization for transmitting PUCCH format 2. If the remaining OFDM symbols, other than a first OFDM symbol of a specific slot, are indicated as a transmission starting symbol of PUCCH format 2, the terminal may apply, to $N_{ID}^0$ of Equation (2), a value configured in scramblingID0 included in DMRS-UplinkConfig IE of the dmrs-UplinkForPUSCH-MappingTypeB for DMRS sequence initialization for transmitting PUCCH format 2. As described above in relation to PUSCH uplink DMRS mapping type, this method is advantageous in that the PUSCH uplink DMRS mapping type A allows a PUSCH transmission to start in a first OFDM symbol, and the PUSCH uplink DMRS mapping type B allows a PUSCH transmission to start in a random OFDM symbol.

In Embodiment 1, if the terminal has failed to receive any configuration of the PUSCH uplink DMRS mapping type, the terminal may apply $N_{ID}^{cell}$, which is a cell ID value to $N_{ID}^0$ of Equation (2).

Embodiment 1 is advantageous in that if a configuration of at least one of two PUSCH uplink DMRS mapping types is received from a base station, a DMRS sequence of PUCCH format 2 can be initialized based on a higher layer signal configured by the base station for PUSCH transmission, and thus, can make the features of PUSCH transmission and PUCCH transmission by the terminal coincide with each other.

Embodiment 2

Embodiment 2 describes a method for applying DMRS sequence initialization for PUCCH format 2 based on a specific PUSCH uplink DMRS mapping type, which serves as a reference, regardless of the PUSCH uplink DMRS mapping type, the configuration of which has been received from a base station.

In Embodiment 2, a specific PUSCH uplink DMRS mapping type is applied as a reference for applying DMRS sequence initialization for PUCCH format 2. The specific PUSCH uplink DMRS mapping type that serves as the reference is determined in the standards, so a terminal may determine what is the reference. Further, the terminal may receive the mapping type by a higher layer signal and determine what is the reference.

If the specific PUSCH uplink DMRS mapping type serving as the reference is A, a description will be made of a terminal operation when the terminal receives and when the terminal fails to receive a configuration of PUSCH uplink DMRS mapping type A through dmrs-UplinkForPUSCH-MappingTypeA. If the terminal has received a configuration of the PUSCH uplink DMRS mapping type A through dmrs-UplinkForPUSCH-MappingTypeA, which is a higher layer signal, the terminal may apply, to $N_{ID}^0$ of Equation (2), a value configured in scramblingID0 included in DMRS-UplinkConfig IE of the dmrs-UplinkForPUSCH-MappingTypeA as a reference for DMRS sequence initialization for PUCCH format 2 transmission. In this instance, the terminal may apply the dmrs-UplinkForPUSCH-MappingTypeA as the reference for the DMRS sequence initialization, regardless of whether a configuration of PUSCH uplink DMRS mapping type B is received through dmrs-UplinkForPUSCH-MappingTypeB.

If the terminal has failed to receive a configuration of the dmrs-UplinkForPUSCH-MappingTypeA, which is a higher layer signal, the terminal has no dmrs-UplinkForPUSCH-MappingTypeA configuration as the reference for the DMRS sequence initialization for PUCCH format 2 transmission. In this instance, although the terminal receives the dmrs-UplinkForPUSCH-MappingTypeB, and thus, has a configuration of the PUSCH uplink DMRS mapping type B, the terminal may apply $N_{ID}^{cell}$ which is a cell ID value to $N_{ID}^0$ of Equation (2).

If the specific PUSCH uplink DMRS mapping type serving as the reference is B, a description will be made of a terminal operation when the terminal receives and when the terminal fails to receive a configuration of PUSCH uplink DMRS mapping type B through dmrs-UplinkForPUSCH-MappingTypeB. If the terminal has received a configuration of PUSCH uplink DMRS mapping type B through dmrs-UplinkForPUSCH-MappingTypeB, which is a higher layer signal, the terminal may apply, to $N_{ID}^0$ of Equation (2), a value configured in scramblingID0 included in DMRS-UplinkConfig IE of the dmrs-UplinkForPUSCH-MappingTypeB as a reference for DMRS sequence initialization for PUCCH format 2 transmission. In this instance, the terminal may apply the dmrs-UplinkForPUSCH-MappingTypeB as the reference for the DMRS sequence initialization, regardless of whether a configuration of PUSCH uplink DMRS mapping type A is received through dmrs-UplinkForPUSCH-MappingTypeA.

If the terminal has failed to receive a configuration of the dmrs-UplinkForPUSCH-MappingTypeB, which is a higher layer signal, the terminal has no dmrs-UplinkForPUSCH-MappingTypeB configuration as the reference for the DMRS sequence initialization for PUCCH format 2 transmission. In this instance, although the terminal receive the dmrs-UplinkForPUSCH-MappingTypeA, and thus, has a configuration of the PUSCH uplink DMRS mapping type A, the terminal may apply $N_{ID}^{cell}$, which is a cell ID value, to $N_{ID}^0$ of Equation (2).

In Embodiment 2, if the terminal has failed to receive any configuration of the PUSCH uplink DMRS mapping type, the terminal may apply $N_{ID}^{cell}$, which is a cell ID value, to $N_{ID}^0$ of Equation (2).

Embodiment 2 is advantageous in that a DMRS sequence of PUCCH format 2 can be initialized based on a PUSCH uplink DMRS mapping type configured as a reference by the base station, regardless of a higher layer signal configured by the base station for PUSCH transmission.

Figure 5A:
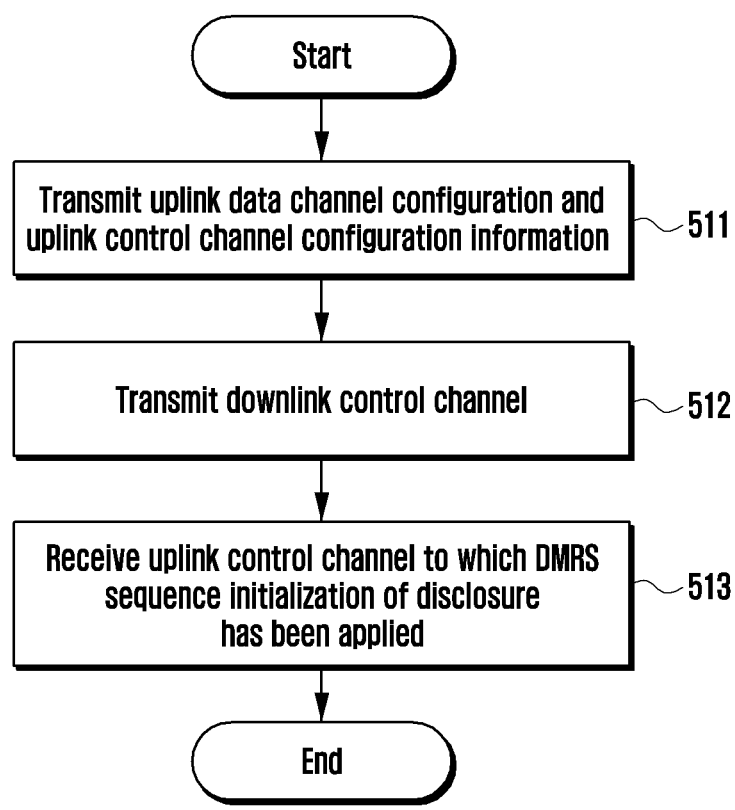
FIG. 5A is a flowchart illustrating a base station process according to an embodiment.

FIG. 5A is flowchart illustrating a base station process according to an embodiment.

Referring to FIG. 5A, in step 511, the base station transmits uplink data channel configuration information and uplink control channel configuration information to the terminal. As described above, the uplink data channel configuration information may include PUSCH uplink DMRS mapping types. The uplink control channel configuration information may include PUCCH resources and PUCCH format 2 configuration information to allow the terminal to transmit PUCCH format 2.

In step 512, the base station transmits a downlink control channel to the terminal. The downlink control channel may include information indicating specific information among information included in the PUCCH resources. The downlink control channel may be common information for a group of terminals or all terminals in a cell, and may be transmitted only to a specific terminal.

In step 513, the base station receives, from the terminal, an uplink control channel including PUCCH format 2 having a DMRS signal in which a DMRS sequence has been initialized based on a PUSCH uplink DMRS mapping type, a frequency resource, and a transmission time including the PUCCCH resources indicated in step 511 or 512.

Figure 5B:
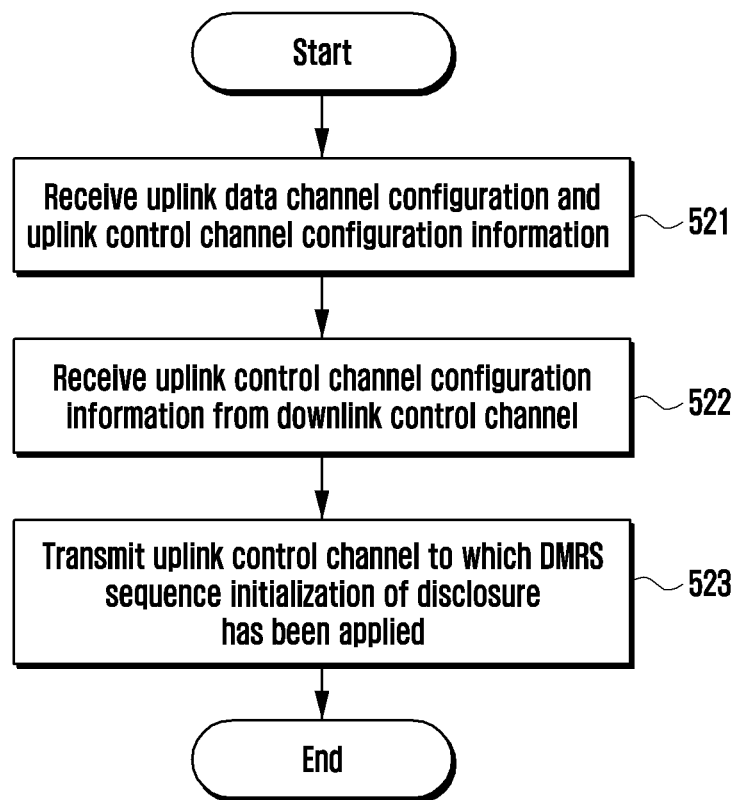
FIG. 5B is a flowchart illustrating a terminal process according to an embodiment.

FIG. 5B is flowchart illustrating a terminal process according to an embodiment.

Referring to FIG. 5B, in step 521, the terminal receives uplink control channel configuration information from the base station. As described above, the uplink data channel configuration information may include PUSCH uplink DMRS mapping types. The uplink control channel configuration information may include PUCCH resources and PUCCH format 2 configuration information to allow the terminal to transmit PUCCH format 2.

In step 522, the terminal receives a downlink control channel from the base station. The downlink control channel may include information indicating specific information among information included in the PUCCH resources. The downlink control channel may be common information for a group of terminals or all terminals in a cell, or may be information transmitted only to a specific terminal.

In step 523, the terminal transmits an uplink control channel including PUCCH format 2 having a DMRS signal in which a DMRS sequence has been initialized based on a PUSCH uplink DMRS mapping type, a frequency resource, and a transmission time including the PUCCCH resources indicated in step 521 or 522.

Figure 6:
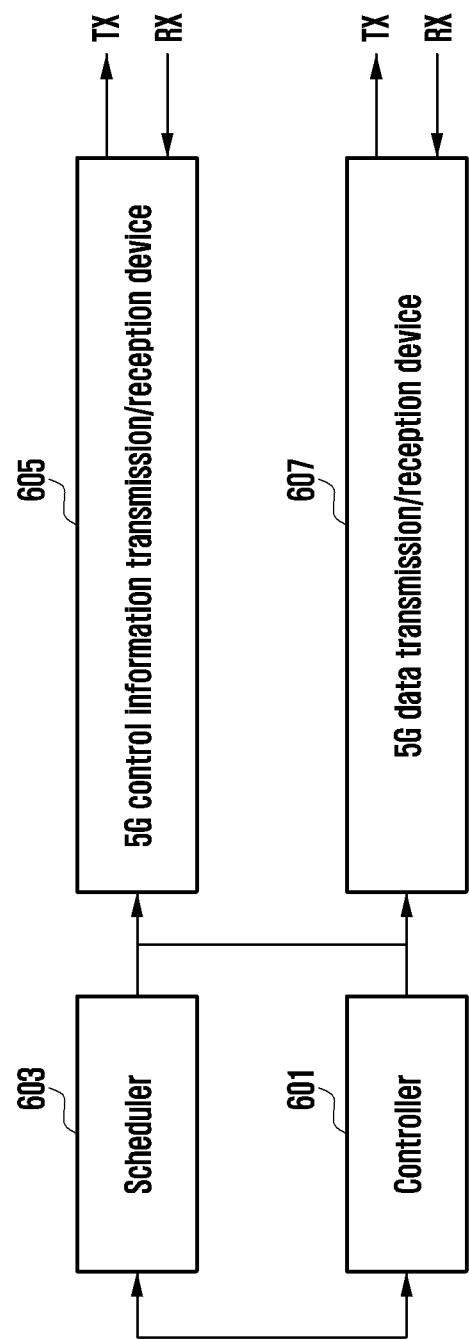
FIG. 6 illustrates a base station device according to an embodiment.

FIG. 6 illustrates a base station device according to an embodiment.

Referring to FIG. 6, the base station device 600 includes a controller 601, a scheduler 603, a 5G control information transmission/reception device 605, and a 5G data transmission/reception device 607. The controller 601 controls the base station process, the uplink data channel configuration, and the uplink control channel configuration according to the above-described embodiments, and may be implemented to include at least one processor. The controller 601 transmits control information and data to a terminal through the 5G control information transmission/reception device 605 and the 5G data transmission/reception device 607, receives control information from a 5G terminal through the 5G control information transmission/reception device 605. The scheduler 603 schedules 5G data, and transmits/receives the 5G data to/from the 5G terminal through the 5G data transmission/reception device 607. The 5G control information transmission/reception device 605 and the 5G data transmission/reception device 607 may be referred to collectively as a transceiver.

Figure 7:
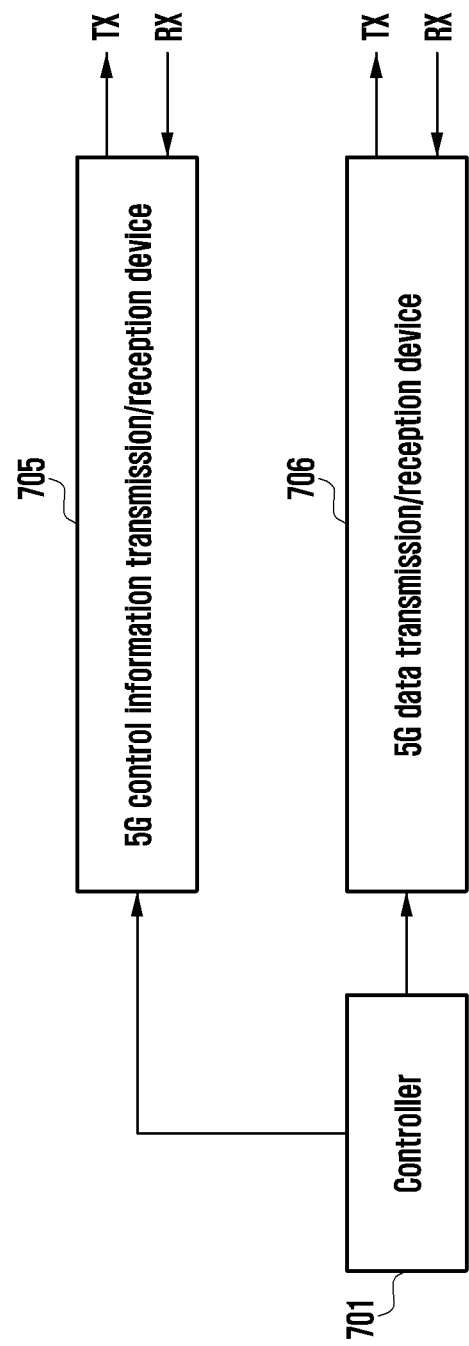
FIG. 7 illustrates a terminal device according to an embodiment.

FIG. 7 illustrates a terminal device according to an embodiment.

Referring to FIG. 7, the terminal device 700 includes a controller 701, a 5G control information transmission/reception device 705, and a 5G data transmission/reception device 706. The controller 701 receives an uplink control channel transmission resource position from a base station through the 5G control information transmission/reception device 705 and the 5G data transmission/reception device 706 based on an uplink data channel configuration and an uplink control channel configuration according to the above-described embodiments, transmits 5G control information to a 5G base station through the 5G control information transmission/reception device 705 in the received resource position, and transmits/receives scheduled 5G data to/from the 5G base station through the 5G data transmission/reception device 706. The controller 701 may be implemented to include at least one processor. The 5G control information transmission/reception device 705 and the 5G data transmission/reception device 706 may be collectively referred to as a transceiver.

While the disclosure has been shown and described with reference to certain embodiments thereof, it will be apparent to those skilled in the art that the disclosure is not limited to these embodiments, and various changes in form and details may be made therein without departing from the spirit and scope of the present disclosure as defined by the appended claims and their equivalents.

What is claimed is:

1. A base station in a wireless communication system, the base station comprising:
   a transceiver; and
   a controller coupled with the transceiver and configured to:
   transmit, to a terminal, physical uplink control channel (PUCCH) configuration information for a PUCCH format 2, the PUCCH configuration information including information on a PUCCH resource, and
   receive, from the terminal, uplink control information and a PUCCH demodulation reference signal (DMRS) for the PUCCH format 2 on the PUCCH resource,
   wherein a sequence of the PUCCH DMRS for the PUCCH format 2 is generated based on an initialization of the sequence using a scrambling identity (ID) 0 for a mapping type B of a physical uplink shared channel (PUSCH) without consideration of a scrambling ID 0 for a mapping type A of the PUSCH.

2. The base station of claim 1, wherein the scrambling ID 0 for the mapping type B of the PUSCH is included in PUSCH configuration information transmitted via radio resource control (RRC) signaling.

3. The base station of claim 2, wherein in case that the scrambling ID 0 for the mapping type A of the PUSCH is transmitted, the scrambling ID 0 for the mapping type A of the PUSCH is included in the PUSCH configuration information.

4. The base station of claim 1, wherein the information on the PUCCH resource includes at least one of a number of physical resource blocks, a number of symbols, or an index of a starting symbol for the PUCCH resource of the PUCCH format 2.

5. The base station of claim 1, wherein the uplink control information includes at least one of a hybrid automatic repeat request acknowledgement (HARQ-ACK), channel state information (CSC), or a scheduling request (SR).

6. A method performed by a base station in a wireless communication system, the method comprising:
transmitting, to a terminal, physical uplink control channel (PUCCH) configuration information for a PUCCH format 2, the PUCCH configuration information including information on a PUCCH resource; and
receiving, from the terminal, uplink control information and a PUCCH demodulation reference signal (DMRS) for the PUCCH format 2 on the PUCCH resource,
wherein a sequence of the PUCCH DMRS for the PUCCH format 2 is generated based on an initialization of the sequence using a scrambling identity (ID) 0 for a mapping type B of a physical uplink shared channel (PUSCH) without consideration of a scrambling ID 0 for a mapping type A of the PUSCH.

7. The method of claim 6, wherein the scrambling ID 0 for the mapping type B of the PUSCH is included in PUSCH configuration information transmitted via radio resource control (RRC) signaling.

8. The method of claim 7, wherein in case that the scrambling ID 0 for the mapping type A of the PUSCH is transmitted, the scrambling ID 0 for the mapping type A of the PUSCH is included in the PUSCH configuration information.

9. The method of claim 6, wherein the information on the PUCCH resource includes at least one of a number of physical resource blocks, a number of symbols, or an index of a starting symbol for the PUCCH resource of the PUCCH format 2.

10. The method of claim 6, wherein the uplink control information includes at least one of a hybrid automatic repeat request acknowledgement (HARQ-ACK), channel state information (CSI), or a scheduling request (SR).

11. A terminal in a wireless communication system, the terminal comprising:
a transceiver; and
a controller coupled with the transceiver and configured to:
receive, from a base station, physical uplink control channel (PUCCH) configuration information for a PUCCH format 2, the PUCCH configuration information including information on a PUCCH resource,
perform an initialization of a sequence of a PUCCH demodulation reference signal (DMRS) for the PUCCH format 2 based on a scrambling identity (ID) 0 for a mapping type B of a physical uplink shared channel (PUSCH) without consideration of a scrambling ID for a mapping type A of the PUSCH,
generate the sequence of the PUCCH DMRS for the PUCCH format 2, and
transmit, to the base station, uplink control information and the PUCCH DMRS for the PUCCH format 2 on the PUCCH resource.

12. The terminal of claim 11, wherein the scrambling ID 0 for the mapping type B of the PUSCH is included in PUSCH configuration information received via radio resource control (RRC) signaling.

13. The terminal of claim 12, wherein in case that the scrambling ID 0 for the mapping type A of the PUSCH is obtained, the scrambling ID 0 for the mapping type A of the PUSCH is included in the PUSCH configuration information.

14. The terminal of claim 11, wherein the information on the PUCCH resource includes at least one of a number of physical resource blocks, a number of symbols, or an index of a starting symbol for the PUCCH resource of the PUCCH format 2.

15. The terminal of claim 11, wherein the uplink control information includes at least one of a hybrid automatic repeat request acknowledgement (HARQ-ACK), channel state information (CSI), or a scheduling request (SR).

16. A method performed by a terminal in a wireless communication system, the method comprising:
receiving, from a base station, physical uplink control channel (PUCCH) configuration information for a PUCCH format 2, the PUCCH configuration information including information on a PUCCH resource;
performing an initialization of a sequence of a PUCCH demodulation reference signal (DMRS) for the PUCCH format 2 based on a scrambling identity (ID) 0 for a mapping type B of a physical uplink shared channel (PUSCH) without consideration of a scrambling ID 0 for a mapping type A of the PUSCH;
generating the sequence of the PUCCH DMRS for the PUCCH format 2; and
transmitting, to the base station, uplink control information and the PUCCH DMRS for the PUCCH format 2 on the PUCCH resource.

17. The method of claim 16, wherein the scrambling ID 0 for the mapping type B of the PUSCH is included in PUSCH configuration information received via radio resource control (RRC) signaling.

18. The method of claim 17, wherein in case that the scrambling ID 0 for the mapping type A of the PUSCH is obtained, the scrambling ID 0 for the mapping type A of the PUSCH is included in the PUSCH configuration information.

19. The method of claim 16, wherein the information on the PUCCH resource includes at least one of a number of physical resource blocks, a number of symbols, or an index of a starting symbol for the PUCCH resource of the PUCCH format 2.

20. The method of claim 16, wherein the uplink control information includes at least one of a hybrid automatic repeat request acknowledgement (HARQ-ACK), channel state information (CSI), or a scheduling request (SR).

* * * * *